United States Patent [19]
Williams

[11] Patent Number: 5,905,884
[45] Date of Patent: *May 18, 1999

[54] METHOD AND SYSTEM FOR REGISTERING AND RETRIEVING DATA FORMATS FOR OBJECTS USING A PERSISTENT REGISTRY

[75] Inventor: Antony S. Williams, Redmond, Wash.

[73] Assignee: Microsoft Corporation, Redmond, Wash.

[ * ] Notice: This patent is subject to a terminal disclaimer.

[21] Appl. No.: 08/884,448

[22] Filed: Jun. 27, 1997

Related U.S. Application Data

[63] Continuation of application No. 08/382,214, Jan. 30, 1995, Pat. No. 5,692,157, which is a continuation of application No. 07/900,968, Jun. 17, 1992, abandoned.

[51] Int. Cl.$^6$ ........................................... G06F 5/00
[52] U.S. Cl. ................ 395/500; 395/200.57; 395/200.58
[58] Field of Search ............................... 395/500, 200.57, 395/200.58

[56] References Cited

U.S. PATENT DOCUMENTS

| | | | |
|---|---|---|---|
| 4,509,113 | 4/1985 | Heath | 364/200 |
| 4,604,710 | 8/1986 | Amezcua et al. | 364/200 |
| 4,631,666 | 12/1986 | Harris et al. | 364/200 |
| 4,754,428 | 6/1988 | Schultz et al. | 364/200 |
| 5,210,824 | 5/1993 | Putz et al. | 395/145 |
| 5,261,080 | 11/1993 | Khoyi et al. | 395/500 |
| 5,802,305 | 9/1998 | McKaughan et al. | 395/200.57 |

OTHER PUBLICATIONS

Microsoft Windows Software Development Kit, vol. 1, Version 3.0 for the MS–DOS and PC–DOS Operating Systems, Microsoft Corporation, 1990, pp. 1–58, 1–59, 4–28, 4–29, 4–10, 4–11, 4–116, 1–117, 4–156, 4–157, 4–158, 4–159, 4–320, 4–321, 4–346, 4–347, 4–368, 4–369, 4–370, 4–371, 4–372, 4–373, 6–98, 6–99.

Microsoft Windows Software Development Kit, vol. 2, Version 3.0 for the MS–DOS and PC–DOS Operating Systems, Microsoft Corporation, 1990, pp. 9–5, 9–6, Chapter 15.

Microsoft Windows Software Development Kit, Guide to Programming, Version 3.0 for the MS–DOS and PC–DOS Operating Systems, Microsoft Corporation, 1990, Chapters 13 and 22.

*Primary Examiner*—Kevin J. Teska
*Assistant Examiner*—Hugh Jones
*Attorney, Agent, or Firm*—Seed and Berry LLP

[57] ABSTRACT

A method and system for registering data formats for objects are provided. In a preferred embodiment, a server application registers in a registration database data formats for receiving and for sending data. To send data to the server application, a client application retrieves from the registration database a data format for receiving data from the client application and sends data to the server application in the retrieved data format. To receive data from the server application, the client application retrieves from the registration database a data format for sending data to the client application and requests the server application to send data in the retrieved format.

20 Claims, 23 Drawing Sheets

101 — VAC1.DOC

VAC1 PROJECT
July 1, 1990

SCHEDULE:

|        | WK1 | WK2 | WK3 | WK4 | WK5 |
|--------|-----|-----|-----|-----|-----|
| MODULE2 |    |     |     |     |     |
| MODULE1 |    |     |     |     |     |
| GLOBAL  |    |     |     |     |     |

TABLE 1: SCHEDULE — 102

104

BUDGET:

| ITEM | EST $ | EXP TO DATE | DELTA | RUNNING |
|------|-------|-------------|-------|---------|
| SUPPLIES | 100.00 | 50.00 | +50.00 | 50.00 |
| COMPUTERS | 4000.00 | 3895.00 | +195.00 | 3945.00 |
| MANUALS | 500.00 | 500.00 | 0.00 | 4445.00 |
| TOTAL | 5600.00 | 4445.00 | +245.00 | 4445.00 |

TABLE 2: VAC1 BUDGET — 103

METHOD AND SYSTEM FOR REGISTERING AND RETRIEVING DATA FORMATS FOR OBJECTS USING A PERSISTENT REGISTRY

This application is a continuation of U.S. patent application No. 08/382,214, filed Jan. 30, 1995, now U.S. Pat. No. 5,692,157 which is a continuation of U.S. patent application No. 07/900,968, filed Jun. 17, 1992, now abandoned.

TECHNICAL FIELD

This invention relates generally to a computer method and system for registering data formats for objects and, more specifically, to a method and system for storing data formats supported by a server, retrieving data formats supported by the server, and sending data to the server and requesting the server to return data in the retrieved format.

BACKGROUND OF THE INVENTION

Current document processing computer systems allow a user to prepare compound documents. A compound document is a document that contains information in various formats. For example, a compound document may contain data in text format, chart format, numerical format, etc. FIG. 1 is an example of a compound document. In this example, the compound document 101 is generated as a report for a certain manufacturing project. The compound document 101 contains scheduling data 102, which is presented in chart format; budgeting data 103, which is presented in spreadsheet format; and explanatory data 104, which is presented in text format. In typical prior systems, a user generates the scheduling data 102 using a project management computer program and the budgeting data 103 using a spreadsheet computer program. After this data has been generated, the user creates the compound document 101, enters the explanatory data 104, and incorporates the scheduling data .102 and budgeting data 103 using a word processing computer program.

FIG. 2 shows how the scheduling data, budgeting data, and explanatory data can be incorporated into the compound document. The user generates scheduling data using the project management program 201 and then stores the data in the clipboard 203. The user generates budgeting data using the spreadsheet program 204 and then stores the data in the clipboard 203. The clipboard 203 is an area of storage (disk or memory) that is typically accessible by any program. The project management program 201 and the spreadsheet program 204 typically store the data into the clipboard in a presentation format. A presentation format is a format in which the data is easily displayed on an output device. For example, the presentation format may be a bitmap that can be displayed with a standard bitmap block transfer operation (BitBlt). The storing of data into a clipboard is referred to as "copying" to the clipboard.

After data has been copied to the clipboard 203, the user starts up the word processing program 206 to create the compound document 101. The user enters the explanatory data 104 and specifies the locations in the compound document 101 to which the scheduling data and budgeting data that are in the clipboard 203 are to be copied. The copying of data from a clipboard to a document is referred to as "pasting" from the clipboard. The word processing program 206 then copies the scheduling data 102 and the budgeting data 103 from the clipboard 203 into the compound document 101 at the specified locations. Data that is copied from the clipboard into a compound document is referred to as "embedded" data. The word processing program 206 treats the embedded data as simple bitmaps that it displays with a BitBlt operation when rendering the compound document 101 on an output device. In some prior systems, a clipboard may only be able to store data for one copy command at a time. In such a system, the scheduling data can be copied to the clipboard and then pasted into the compound document. Then, the budgeting data can be copied to the clipboard and then pasted into the compound document.

Since word processors typically process only text data, users of the word processing program can move or delete embedded data, but cannot modify embedded data, unless the data is in text format. Thus, if a user wants to modify, for example, the budgeting data 103 that is in the compound document 101, the user must start up the spreadsheet program 204, load in the budgeting data 103 from a file, make the modifications, copy the modifications to the clipboard 203, start up the word processing program 206, load in the compound document 101, and paste the modified clipboard data into the compound document 101.

Some prior systems store links to the data to be included in the compound document rather than actually embedding the data. When a word processing program pastes the data from a clipboard into a compound document, a link is stored in the compound document. The link points to the data (typically residing in a file) to be included. These prior systems typically provide links to data in a format that the word processing program recognizes or treats as presentation format. For example, when the word processing program 206 is directed by a user to paste the scheduling data and budgeting data into the compound document by linking, rather than embedding, the names of files in which the scheduling data and budgeting data reside in presentation format are inserted into the document. Several compound documents can contain links to the same data to allow one copy of the data to be shared by several compound documents.

SUMMARY OF THE INVENTION

It is an object of the present invention to provide a method and system for registering data formats for a server application.

It is another object of the present invention to provide a method and system for registering data formats that the server application can both receive and send data in.

It is another object of the present invention to provide a method and system for a client application to determine which data formats a server application supports without launching the server application.

It is another object of the present invention to provide a method and system for transferring data between a server and client application.

These and other objects, which will become apparent as the invention is more fully described below, are obtained by a method and system for transferring data between a server and client application. In a preferred embodiment, the data formats that the server application supports are stored in a persistent global registry. The client application retrieves the data formats from the persistent global registry and requests the server application to supply data in the retrieved format. The server application, upon receiving the request, supplies the data in the retrieved format.

BRIEF DESCRIPTION OF THE DRAWINGS

FIG. 1 is an example of a compound document.

DETAILED DESCRIPTION OF THE INVENTION

Figure 2:
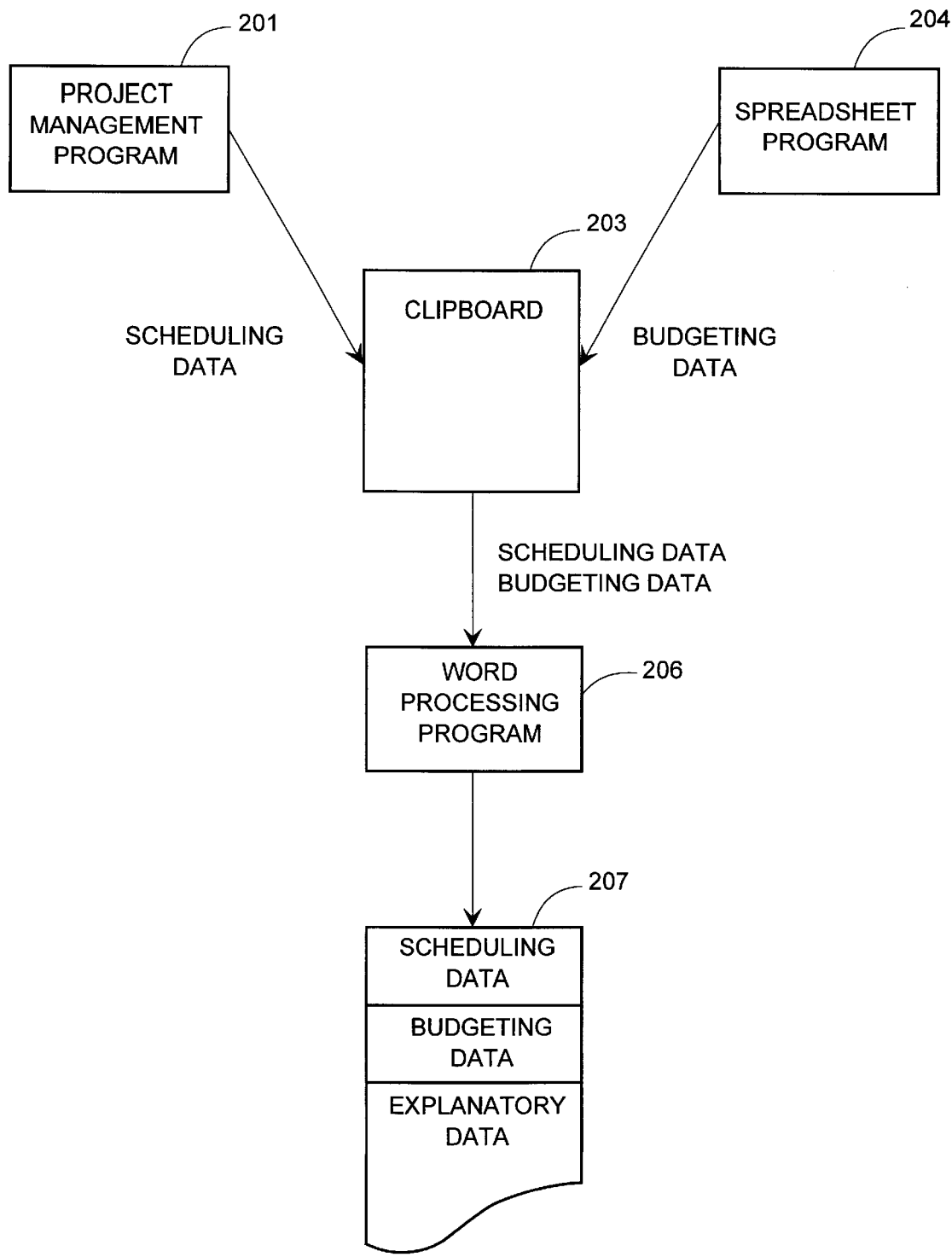
FIG. 2 is a block diagram illustrating the incorporation of the scheduling data, budgeting data, and explanatory data into the compound document.

The present invention provides a method in which data that is contained within a compound document can be manipulated directly by the application program that creates the data. In a preferred embodiment, an application program that creates data can store data in various formats and receive data in various formats. The application program registers the formats by storing the formats in a persistent registry. Another application program can check the persistent registry to determine which formats are supported. The other application can send or receive data in a registered format. In a preferred embodiment, an application program that creates a compound document controls the manipulation of linked or embedded data that was generated by another application. In object-oriented parlance, this data is referred to as an object. (The reference Budd, T., "An Introduction to Object-Oriented Programming," Addison-Wesley Publishing Co., Inc., 1991, provides an introduction to object-oriented concepts and terminology.) An object that is either linked or embedded into a compound document is "contained" within the document. Also, a compound document is referred to as a "container" object and the objects contained within a compound document are referred to as "containee" objects. Referring to FIGS. 1 and 2, the scheduling data 102 and budgeting data 103 are containee objects and the compound document 101 is a container object. Continuing with the example of FIGS. 1 and 2, the user can indicate to the word processor that the user wants to edit a containee object, such as the budgeting data 103. When the user indicates that the budgeting data 103 is to be edited, the word processing program determines which application should be used to edit the budgeting data (e.g., the spreadsheet program) and launches (starts up) that application. The user can then manipulate the budgeting data using the launched application, and changes are reflected in the compound document.

In a preferred embodiment of the present invention, applications cooperate using object linking and embedding facilities to create and manipulate compound documents. An application that creates a compound document is referred to as a client application, and applications that create and manipulate containee objects are referred to as server applications. Referring to FIG. 2, the project management program 201 and the spreadsheet program 204 are server applications, and the word processing program 206 is a client application. A client application is responsible for selection of the various objects within the container object and for invoking the proper server application to manipulate the selected containee object. A server application is responsible for manipulating the contents of the containee objects.

In a preferred embodiment, applications are provided with an implementation-independent Application Programming Interface (API) that provides the object linking and embedding functionality. The API is a set of routines (functions) that are invoked by client and server applications that support compound documents. These routines manage, among other things, the setup and initialization necessary for client applications to send and receive messages and data to and from server applications. The API routines are divided into a client library and a server library. The client library provides routines which invoke the correct server application to act upon a particular containee object. The server library provides routines which process requests to manipulate containee objects.

Figure 3:
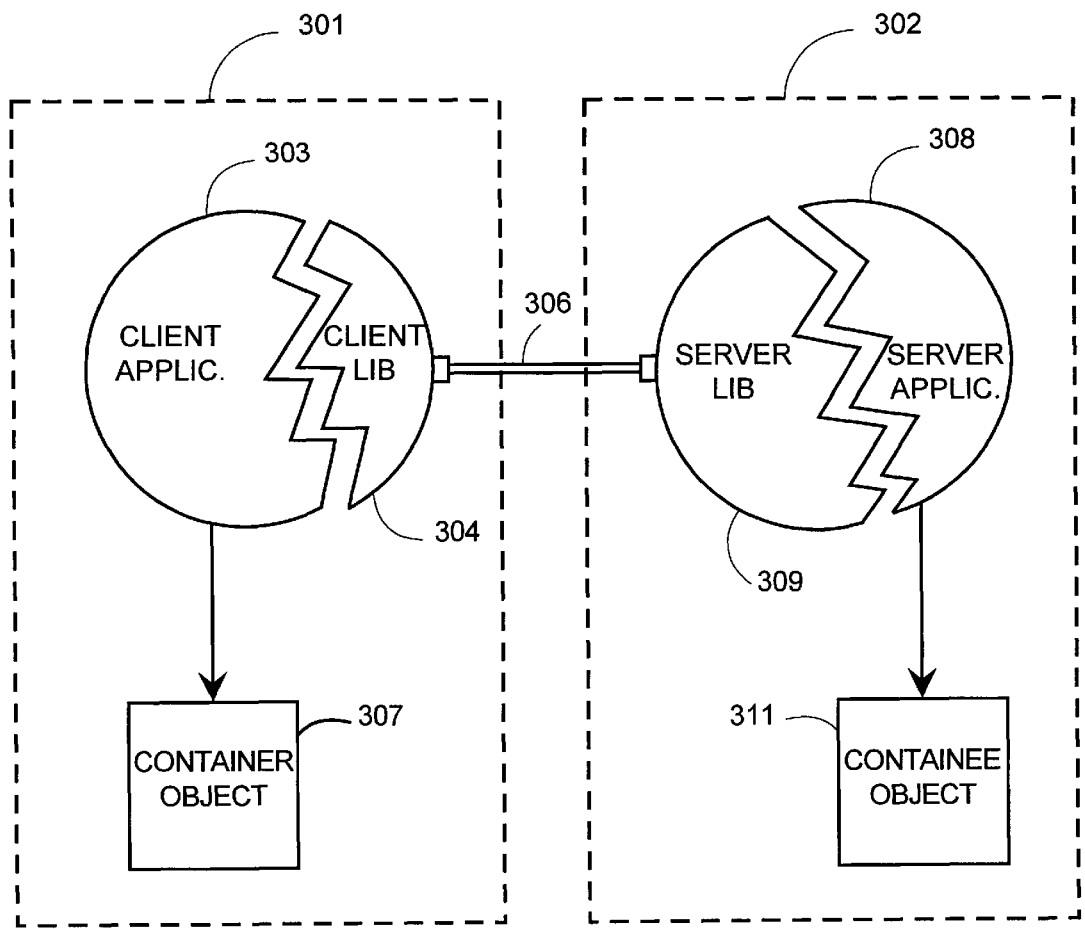
FIG. 3 is a block diagram illustrating the relationships between client and server applications in a preferred embodiment.

FIG. 3 illustrates the relationships between client and server applications in a preferred embodiment. In this embodiment, client applications and server applications are separate processes. The client process 301 includes client application code 303, client library 304, and container object 307. The server process 302 includes server application code 308, server library 309, and containee object 311. The client process 301 communicates with the server process 302 through the communications channel 306. The client library and server library are dynamically linked with the client application code and server application code, respectively, when an application process is started up. One skilled in the art would appreciate other architectural configurations are possible. For example, the client library and server library functions could be implemented as processes separate from the client and server processes.

The use of the client library of the present invention allows a client application program to be developed independently of any particular containee object format. Indeed, a client application, in general, does not need to know anything about the contents of a containee object. It is also preferred that the libraries are linked to the applications dynamically when an application process is created. The dynamic linking allows applications to be marketed without library code and to be easily linked to new versions of the library.

The client library routines typically transfer requests to manipulate a containee object through the communications channel 306 to the server process 302. One skilled in the art would appreciate that the communications channel 306 could be implemented through well-known interprocess communication mechanisms that are provided by various operating systems. The server process 302 responds to requests to manipulate containee objects received through communications channel 306. The server library provides routines through which the server process receives requests to manipulate data and processes the requests accordingly.

An example will help illustrate the relationship between the client process 301 and the server process 302. Referring again to FIG. 1, if a user wants to edit the budgeting data 103 of the compound document 101, then the following sequence of events occurs. First, the user starts up the word processor program, which is dynamically linked to the client library. Second, the user opens the compound document for editing. Third, the user selects the budgeting data, which is a containee object, and indicates that the selected object is to be edited. Fourth, the client application invokes a client library routine for performing an action on an object passing the routine a handle (which uniquely identifies the selected object) to the object and an indicator that the action is edit. Fifth, the client library routine determines that the spreadsheet program provides the actions for the budgeting data. Sixth, the client library starts up the spreadsheet program as a server process, if it is not already started. Seventh, the word processor application sends a message to the spreadsheet program that it should edit the budgeting data. Eighth, the server library receives the request to edit and invokes a routine in the spreadsheet program for editing the data. When editing is complete, the spreadsheet routine returns to the server library. The server library sends a message to the word processor application to indicate that editing is complete. The client library receives the message and returns from its invocation. Upon return from the invocation, the word processor application knows that the editing is complete.

Typically, the start up of a server process can be a relatively slow process. There are certain situations in which it may be unacceptable to incur this overhead. For example, if a user wants to print a compound document that includes many containee objects, it may take an unacceptably long time to start up the server process for each containee object and request each server process to print the object. To ameliorate this unacceptable performance, a server application can provide code that can be dynamically linked during runtime into the client process to provide certain functionality in a more expeditious manner. This code is called an "object handler." Object handlers provide actions on behalf of the server application so that the client library routines can avoid starting up server processes and passing messages to the server process. In the above example, an object handler could provide a print routine that the client library routines could invoke to print a containee object.

Figure 4:
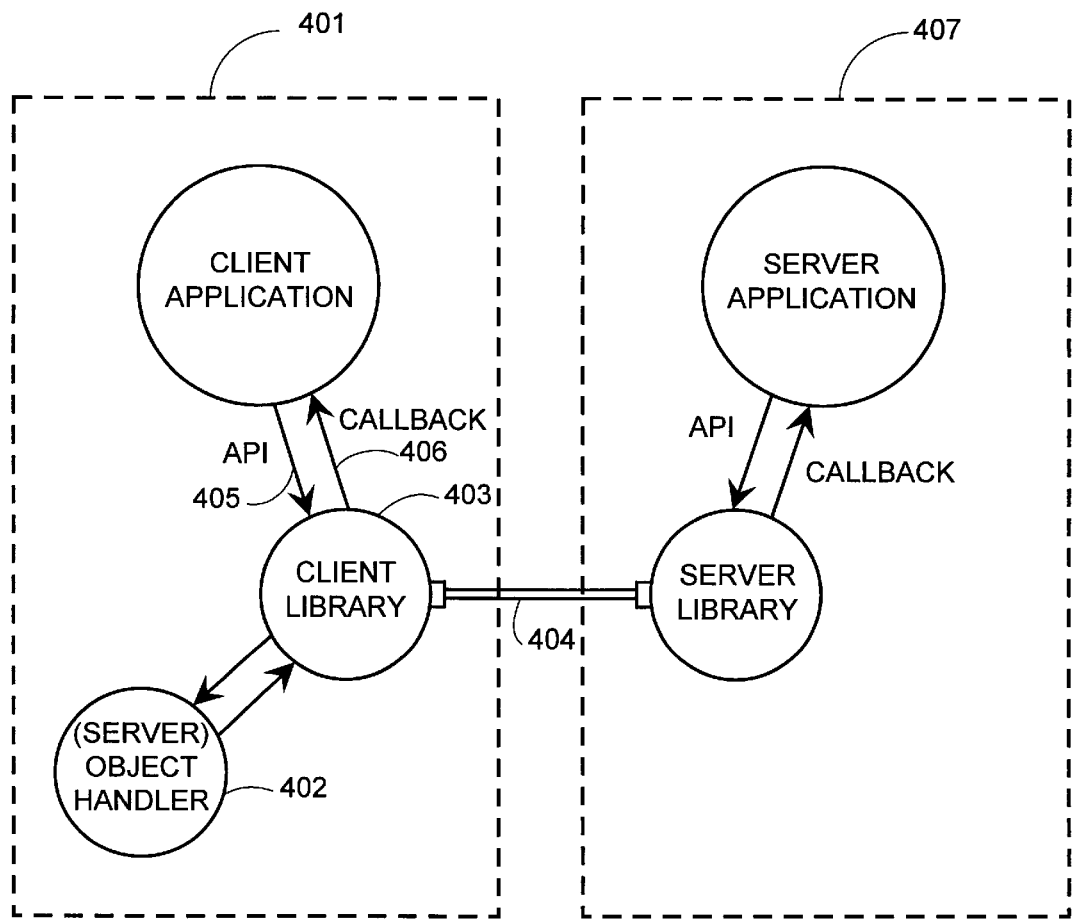
FIG. 4 is a block diagram illustrating the relationship between an object handler and client and server processes.

FIG. 4 shows the relationship between an object handler and the client and server processes. The object handler 402 is linked into the client process address space during runtime by the client library routines. Typically, the client library 403 invokes the object handler 402 directly, and the client application code need not be aware that a handler is providing the services, rather than a server process.

Figure 5:
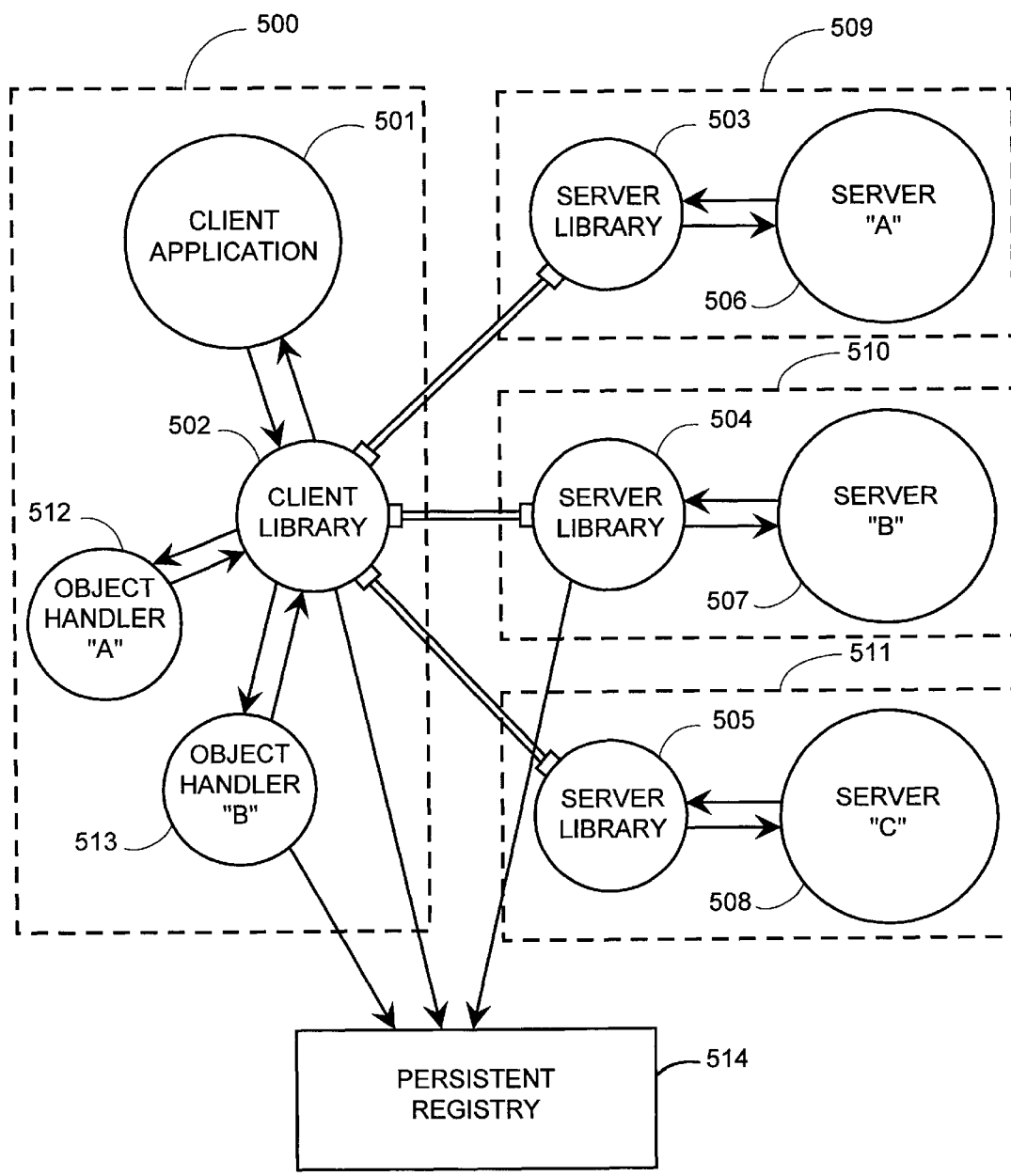
FIG. 5 is a block diagram illustrating the components that comprise the object linking and embedding facilities and the communications paths.

FIG. 5 shows the components that comprise the object linking and embedding facilities and communications paths when a compound document includes containee objects implemented by different server applications. The client process 500 contains the client application 501, the client library 502, and the object handlers "A" and "B" 512, 513. The server processes 509, 510, 511 contain the server applications 506, 507, 508 and server libraries 503, 504, 505. The client process 500 establishes communications channels with each server process 509, 510, 511. Each server process 509, 510, 511 implements a particular type of containee object of the container object that is opened by the client process 500. The client application code 501 is dynamically linked to routines provided by the client library 502. When the client process 500 is running, it communicates synchronously or asynchronously with the server processes 509, 510, 511 using the functionality provided by the client library routines. Similarly, each server process 509, 510, 511 is dynamically linked to routines provided by the server libraries. When the server processes 509, 510, 511 are running, they process messages sent from the client process 500. The client library 502 sets up message passing structures and connections to each server 509, 510, 511. When the client application 501 requests an action on a containee object, the client library 502 sends an appropriate message to the server process that implements the type of the contained object. Alternatively, if the server application has defined an object handler for the requested action, then the client library 502 invokes the object handler to perform the requested action. FIG. 5 shows that two servers 506, 507 have defined object handlers 512, 513. The client library routines access the persistent global registry 514 to determine information such as which server application to use for a particular containee object and whether an object handler is defined for a server application.

In addition to the client and server libraries, the object linking and embedding facilities of the present invention provide information to client and server applications through a persistent global "registry." This registry is a database of information such as (1) for each type of object, the server application that implements the object type, (2) the actions that the each server application provides to client applications, (3) where the executable files for each server application are located, and (4) whether each server application has an associated object handler.

Communication between client and server processes occurs either synchronously or asynchronously. Synchronous communication occurs when one process sends a message to the other process and the sending process suspends activity until the other process completely processes the message. For example, when a client process wants to create a new containee object, the client process (through the client library routines) sends a message to the appropriate server process. The client process waits until the containee object is created before continuing execution. Asynchronous communication occurs when one process sends a message to the other process and the sending process continues execution while the receiving process responds to the message. Typically, when the receiving process has completed responding to the request, it sends a message indicating such completion to the sending process. For example, when a client process wants a containee object saved in a compound document file, the client process sends a message to the server process. The client process can continue to execute (e.g. responding to users requests) while the server process is saving the object. When the server process has completed saving the object, it send a completion message to the client process.

In a preferred embodiment, messages are passed between client and server processes using interprocess communications mechanisms provided by the underlying operating system. The client and server library routines provide an interface through which the details of the interprocess communication are shielded from the client and server applications. A client or server application requests a synchronous action by invoking a library routine. When the routine returns to the requesting application, then the action requested has been completed. Similarly, a client or server application requests an action to occur asynchronously by invoking a library routine. The library routine initiates the action and returns to the requesting application. The requesting application can then continue executing. When the requested action is complete, a message is received which the library routines process. In a preferred embodiment, the library routines use a "callback" routine to respond to the asynchronously received completion message. A callback routine is provided by the requesting application. The address of the callback routine is made available to the corresponding library so that when the library receives an asynchronous message, the library can invoke the callback routine to process the message. One skilled in the art would appreciate that there are numerous ways to accomplish this invocation depending upon the programming language employed.

Figure 6A:
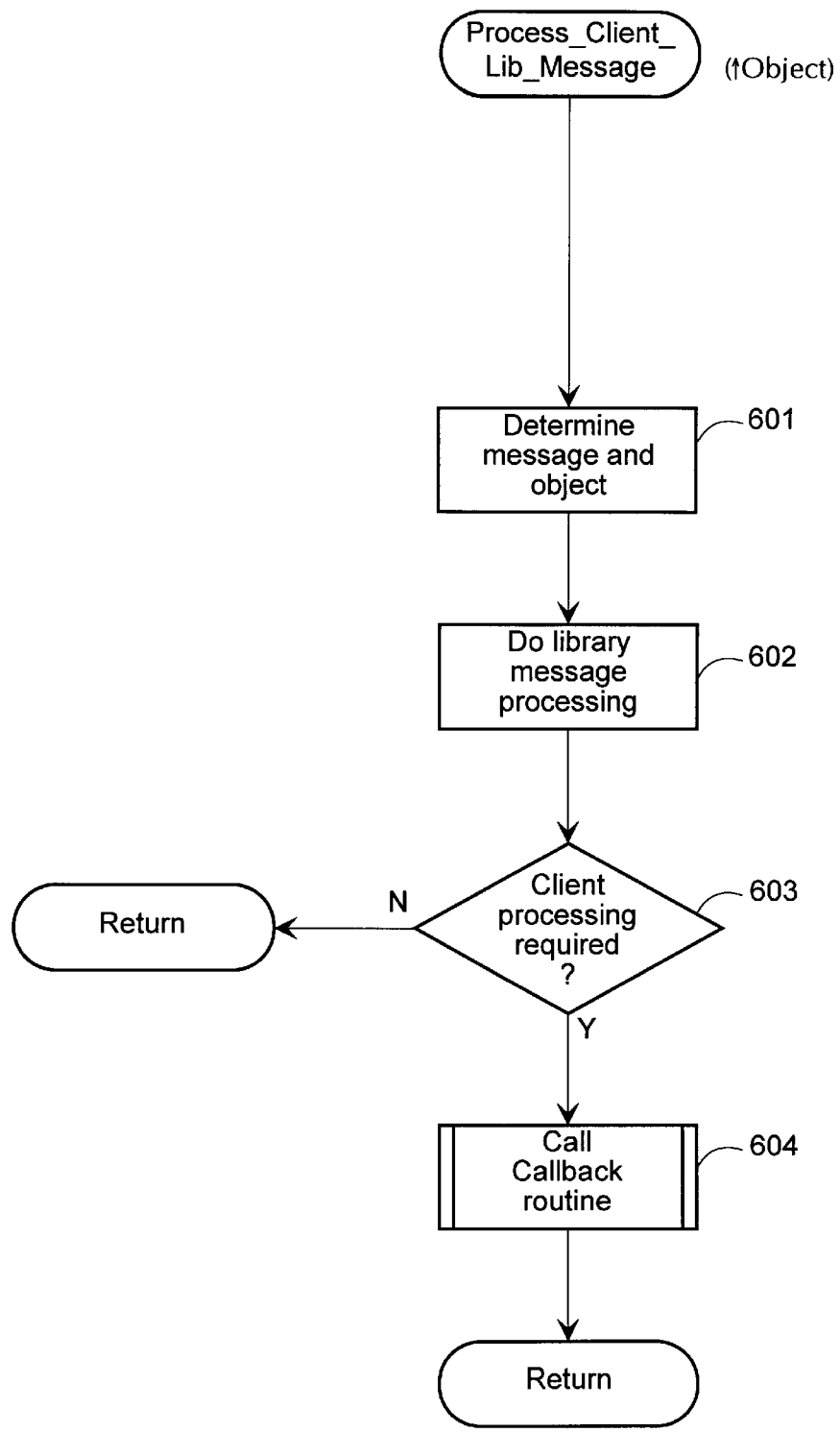
FIG. 6A is a flow diagram of a client library message dispatching routine.

FIG. 6A is a flow diagram of a client library message dispatching routine. When a client process receives a message from a server process, the message is dispatched by the client library to the appropriate routine for processing. This dispatching occurs by invoking the Process_Client_Lib_Message routine. This routine determines to which object the message is directed and invokes the client callback routine to process the message when required. In steps 601 through 604, the client library receives a message, processes the message, and optionally invokes a client callback routine to process the message. In step 601, the routine determines for which containee object the message is directed. In step 602, the routine performs the client library provided processing. In step 603, if client application processing is needed, then the routine continues at step 604, else the routine returns. Client application processing is typically needed to respond to asynchronous messages. In step 604, the routine invokes the client application callback routine indicating the type of message received. The routine then returns.

Figure 6B:
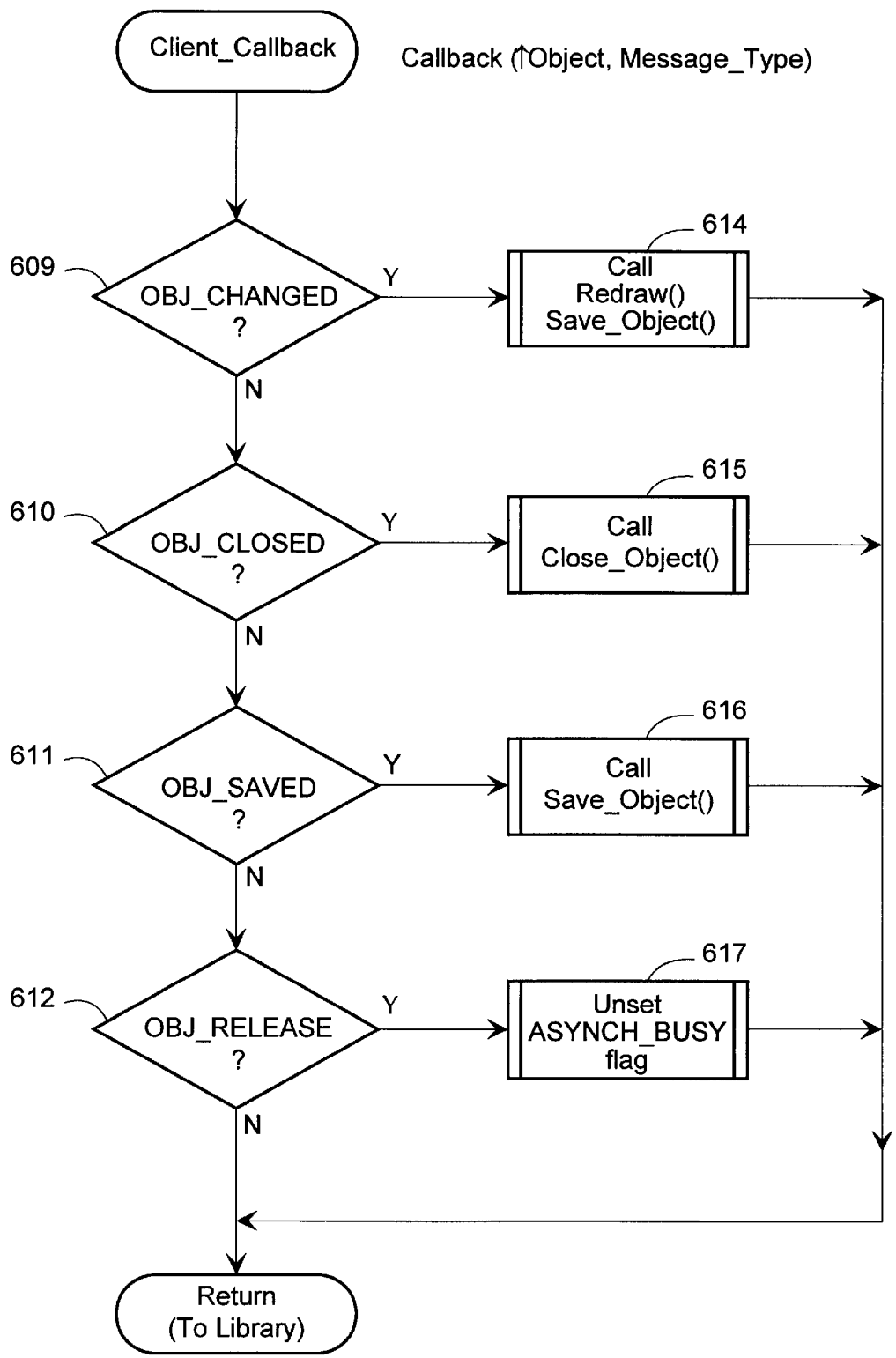
FIG. 6B is a flow diagram of a typical client application callback routine.

FIG. 6B is a flow diagram of a typical client application callback routine. This callback routine invokes the appropriate subroutine defined by the client application to process the asynchronous message. In steps 609 through 617, the callback routine determines the type of message and invokes the appropriate code to process the message. The client callback routine is passed a handle to the object (=object) to which the message is directed and the message type. A client application callback routine typically processes the following messages:

OBJ_CHANGED
OBJ_CLOSED
OBJ_SAVED
OBJ_RELEASE

Server applications also provide callback routines that are invoked by the server library. Typically, all messages that a server receives are asynchronous. A server callback routine typically processes the following messages:

OBJ_OPEN
OBJ_CLOSE
OBJ_SAVE
OBJ_DOACTION
OBJ_RELEASE
OBJ_SHOW
OBJ_UPDATE In addition to being passed an object handle and message type, the server callback routine receives a parameter to indicate the action that is to be performed when the message is OBJ_DOACTION. The additional parameter may also be used to point to arbitrary data. The server library can then pass more than three parameters to the callback routine.

In a preferred embodiment, only one asynchronous action can be pending at any one time for any one object. This restriction ensures that the response received from the client library and dispatched to the client application will be associated with a certain action request such that no computation is needed to decipher which action request the asynchronous message is responding to. One skilled in the art would appreciate that sending additional information during message passing would eliminate the need for this restriction.

The client application requests an asynchronous action by invoking a client library routine. The client library routine, after initiating the request, returns the message, OBJ_WAIT_FOR_RELEASE. At that point, the client application waits to receive an OBJ_RELEASE message through its callback routine before requesting another asynchronous operation upon that object. There are basically two ways a client application can wait for the asynchronous operation to complete. One way is for the client application to continue to process all messages including user input and not generate any additional asynchronous requests for that object. The other way is for the client application to ignore all user input, but continue to get and dispatch all other messages in order to allow the client library to receive and process server library messages. From a user's perspective, the latter method will cause the application to appear unresponsive until the asynchronous request completes.

Figure 7:
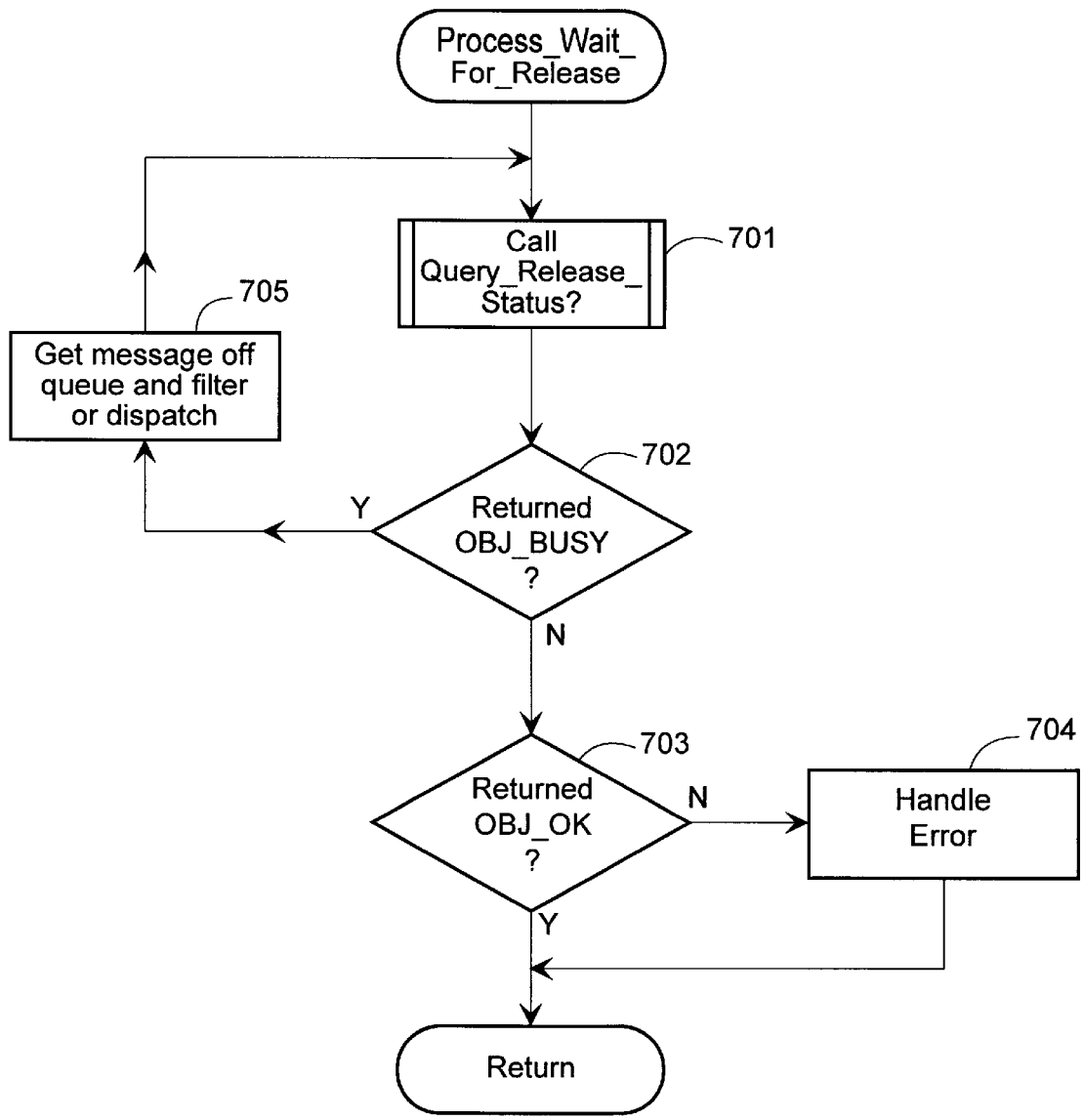
FIG. 7 is an overview flow diagram of a typical function used by a client application to handle waiting for an asynchronous request to complete.

FIG. 7 is an overview flow diagram of a typical function used by a client application to handle waiting for an asynchronous request to complete. The function returns only when the client library says that it is no longer processing an asynchronous request on the object. In step 701, the function calls the client library routine Query_Release Status? to determine whether an asynchronous operation has completed on the object passed as a parameter. In step 702, if Query_Release Status? returned OBJ_BUSY, then the function continues at step 705, otherwise the function continues at step 703. In step 703, if Query_Release Status? returned OBJ_OK, then the asynchronous operation has completed and the function can return. Otherwise, the function must handle an error first and then return; error handling is performed in step 704. In step 705, the function enters a message receive-dispatch loop which effectively blocks until there is input, and when there is, the message is retrieved and dispatched to the appropriate message handler. As described above, user messages can either be dispatched or filtered out. If all messages are read and dispatched, then user input continues to be processed. Otherwise, the function may choose to filter out user messages by reading them and dropping them instead of dispatching them. Once the message is processed, either after a dispatch returns or after filtering the message, the function continues at step 701.

Eventually, one of the messages received in step 705 will be the notification from the server library that the server is done processing the requested asynchronous operation. This message will get dispatched as part of step 705 to the client library message dispatching routine show in FIG. 6A with a pointer to the object passed in as a parameter. As part of step 602 in FIG. 6A, the client library will clear the flag that indicated there was an asynchronous operation underway on the object. In step 604, the client library will invoke the callback routine with the OBJ_RELEASE notification as discussed in reference to FIG. 6B. The client callback routine then returns to the client library message dispatch routine which then returns to the beginning of the loop in step 701 in FIG. 7. At this point, when the client application calls the Query_Release_Status? routine, Query_Release_Status? will return OBJ_OK because the asynchronous operation has completed and the function will return.

Note that, during step 705, if the client application attempts to process another asynchronous request from the user (which is not filtered) on the same containee object, the client library will return OBJ_BUSY in response to the new request. The client application can choose to loop on this call until it returns OBJ_OK, or it can display an error notification to the user.

Client Library Services:

In addition to providing support for the various communication paths, the client library provides a set of linking and embedding functions which can be used by any client application to create and maintain a compound document. The following functions are supported by the client library:

Open_CompoundDoc
Save_CompoundDoc
Close_CompoundDoc
Create_Object
Update_Object
Close_Object
Delete_Object
Display_Object
Activate_Object
Query_Release_Status?
Query_Release_Error Use of these library functions requires the client application to initialize certain data structures upon invocation which are released when the compound document is closed. For example, when a client application is started, it opens the compound document and then allocates and initializes object data structures for each embedded or linked object contained in the compound document. These object data structures are passed as parameters to the library routines. One use of these data structures is to allow the library functions to identify and invoke the appropriate callback routine when an asynchronous operation is performed. Another use of the object data structure is to store the object type so that information can be retrieved for the object from a persistent global registry. The client application should release these data structures when the compound document is closed.

Figure 8:
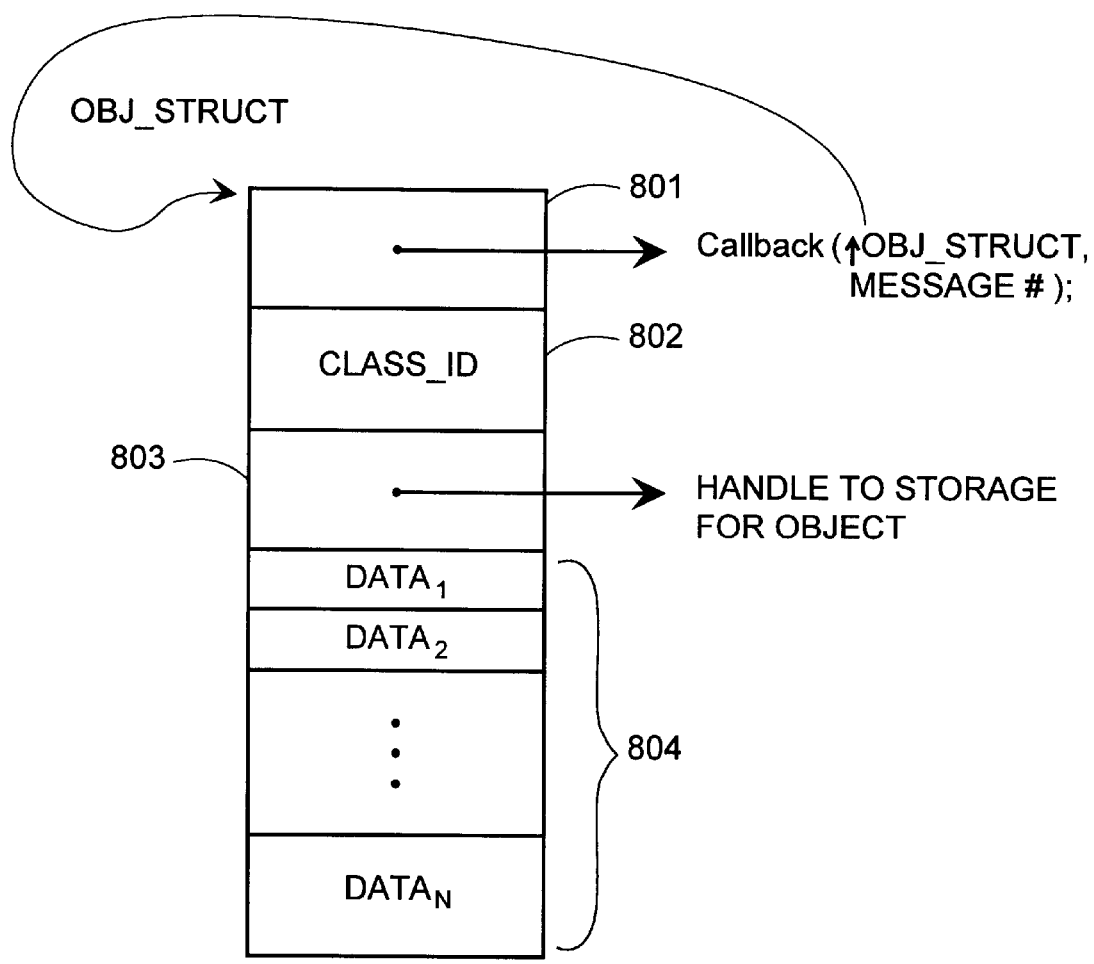
FIG. 8 is a schematic diagram of an object data structure.

FIG. 8 shows a schematic diagram of an object data structure. It consists of several items of information 801, 802, and 803, and optional information 804 that the client application may provide to hold object specific information. Item 801 is a pointer to the client application callback routine for the object. The client library uses this field in its message processing routine (FIG. 6A) to invoke the callback routine when notification to the client application is required. Item 802 is the object type. In object-oriented parlance, this is known as the item "class id". The CLASS_ID field 802 identifies the particular server that implements the object class. A server can store class specific information in the persistent global registry indexed by this CLASS_ID. Item 803 is a handle to the permanent storage of the object.

Item 804 comprises the remainder of the object data structure and is provided by the client application when it defines a wrapper data structure that contains the required information 801 through 803. One skilled in the art would appreciate that the exact definition of the wrapper structure depends upon the programming language used.

The client library routines are invoked by the client application code in the usual course of processing user input. In an event-driven windowing system, the client application calls the appropriate library routine in response to receiving a message indicating that the user has selected a particular menu item or object on the screen.

Figure 9:
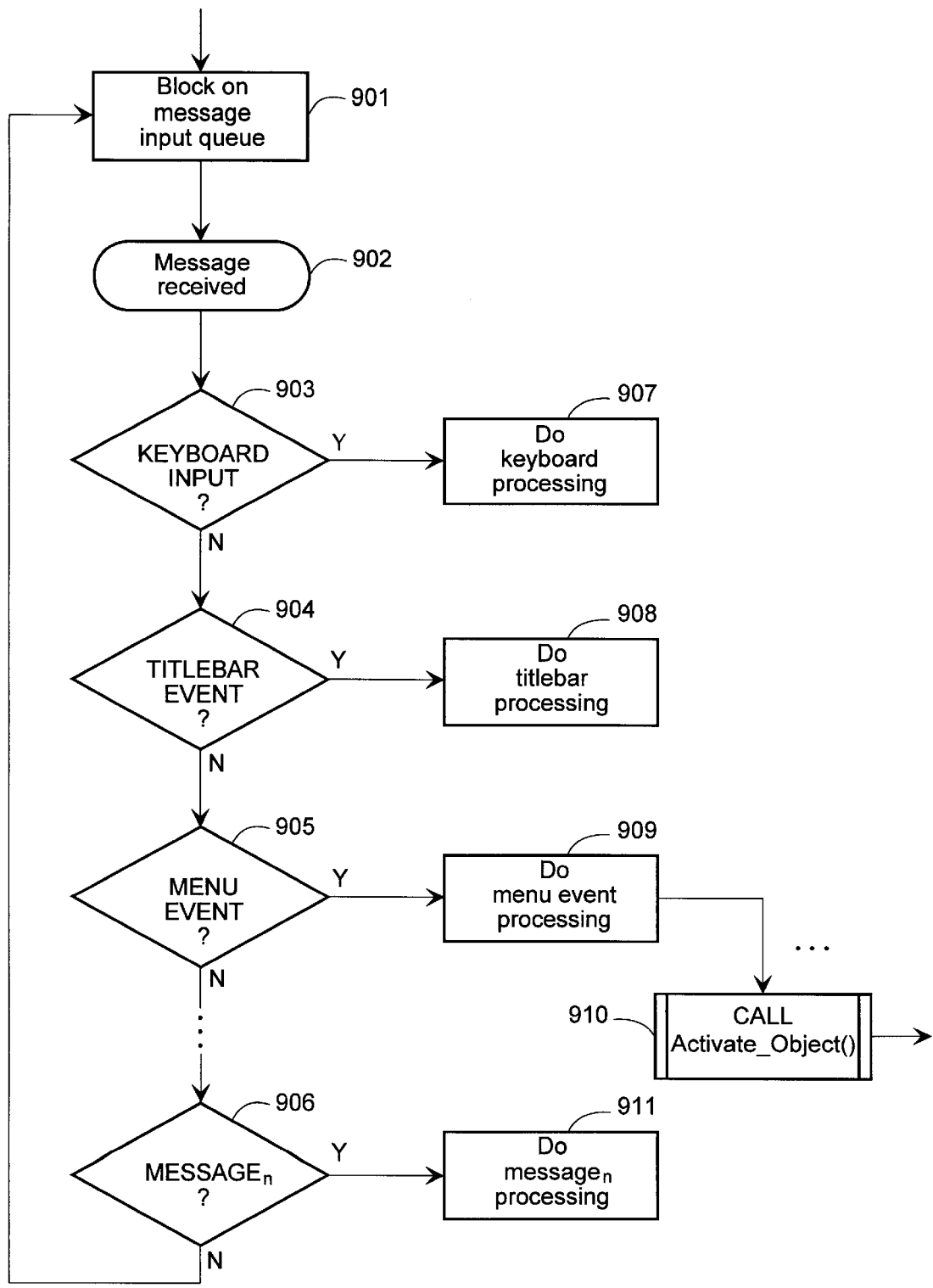
FIG. 9 is an overview flow diagram illustrating a typical input loop for an application in an event-driven windowing operating system environment.

FIG. 9 is an overview flow diagram which shows a typical input loop for an application in an event-driven windowing operating system environment. It is the loop that dispatches messages to the appropriate subroutines. In step 901, the application waits for a message. When it receives a message in step 902, the application decodes the message to determine what type of input event has occurred in steps 903 through 906. Typically, for each type of input event, the application calls a different subroutine, steps 907 through 910. These subroutines in turn may call functions implemented by the object linking and embedding libraries. For example, when a Menu Event is received in step 905, the application will invoke the subroutine that handles processing menu selections in step 909. Step 909 will eventually call routine Activate_Object in step 910 if the object selected is an embedded or linked object and the user selects an action to perform on the object that requires communication with the server application.

In order to understand how these library functions work, it is useful to understand how the storage of compound documents differ from the storage of ordinary documents. An important distinction is that, in a compound document, data managed by different applications resides together (e.g. in the same file); whereas in an ordinary document, all of the data is managed and must be understood by the application that created the ordinary document. Specifically, in a compound document, embedded data is stored along with the native data of the compound document even though the client application cannot interpret the embedded data. Native data refers to data in a format that an application can process directly. For example, a word processor may use a text format for its native data. Embedded data is handled by the client application that maintains the compound document as a stream of bytes because it does not know how to interpret the embedded data. For example, if a compound document contains an embedded spreadsheet range, storage for the compound document will include the actual spreadsheet data in the format native to the server application used to implement the spreadsheet data.

One skilled in the art would appreciate that there are many ways for a client application to store data it does not understand and thus provide storage for embedded objects. One way is for the client application to store the location of the stream of bytes for each object in an object table so the client application knows how to locate and retrieve the embedded object data when needed. Using this method, the embedded data could be stored within the same file as the client application native data. Alternatively, although logically embedded within the compound document, the data for each embedded object could actually be stored in a separate file by the client application.

The following scenario will help illustrate use of the client library linking and embedding functionality in a typical application. When the client application (e.g. a word processing program) creates a compound document that contains text and two embedded objects, such as a graph and spreadsheet data, it first creates and initializes storage for the entire compound document. At that point, the client application has a handle to the entire document and a handle to the native application data (the text). The procedure used by the client application to open a compound document is discussed in more detail below.

In a preferred embodiment of the present invention, the user then inserts the graph and spreadsheet objects by using an "Insert Object" command on the application "Edit" menu. In response to selection of the "Insert Object" menu item, the client application presents the user with a list of the kinds of objects that can be created. The client application constructs this list from the data in the persistent global registry. Once the user selects the desired object (in this case a graph or spreadsheet object), the client application invokes the Create_Object function to create the object. The Create_Object function sends a message to the server application that implements the graph object (through the server library) to create a graph object and to allow the user to edit the object. In one embodiment, the server application returns a handle to the newly-created graph object. Similarly, when the user inserts the spreadsheet object, the client application invokes the Create_Object function to send a message to the server application that implements the spreadsheet object to create a spreadsheet object and to allow the user to edit the object. The server application returns a handle to the spreadsheet object.

Once these embedded objects have been created, the user can edit or otherwise manipulate the objects by selecting an object and selecting an action available on the client application menu. To execute the action, the client application invokes the client library function Activate_Object. Activate_Object invokes the server application that implements the selected object and sends the server application a message indicating the selected action and a handle to the selected object. The server application can then read and write the data of the embedded object in its normal fashion. In addition, the user can "open" an embedded object by either double clicking on the object or by selecting the object and then choosing the application menu item "Open." This "Open" action will result in the client application invoking Activate_Object on the selected object with a default action, determined from the global registry, which is typically "edit." If the user then selects a different object inside the compound document, or selects any of the native text data, the client application closes the previously selected object by invoking the Close_Object client library routine. This routine sends a message to the associated server to shut itself down.

The above scenario was described assuming that the user wanted to work with embedded objects. The same steps would be used to create and manipulate the graph and spreadsheet objects if they were instead linked objects. However, the user would specify that the client application should create a linked object when the user selects the "Insert Object" command.

In addition to the client library routines already discussed, there are several other functions used by the client application to communicate with the server. These functions are Update_Object, Display_Object, Query_Release_Status?, and Query_Release_Error. Update_Object is used by the client application to request an updated presentation format from the server. The presentation format is what is actually displayed in the window of the client application. The presentation may become out of date, for example, if a linked object has not been updated with respect to its source data.

Display_Object is used by the client application to request an object to be redisplayed. The client library passes the request to the server application or the object handler. A bounding rectangle (a display context) is passed to the server or object handler indicating the area of redisplay.

Query_Release Status? and Query Release_Error are used by the client application to obtain information about a previously completed asynchronous server operation. The Query_Release_Status? function is used to determine whether an outstanding asynchronous call has been completed on the specified object. That is, once a client application has been returned an OBJ_WAIT_FOR_RELEASE value as a result of a function call to the client library, the client application then waits until it receives a OBJ_RELEASE message through its callback routine before the client application initiates additional asynchronous actions upon the same object. This waiting is accomplished by looping on a call to Query_Release_Status? until it returns OBJ_OK (see FIG. 7). Once the client application has received the OBJ_RELEASE message, it can invoke the client library routine Query_Release_Error to determine the value returned by the most recent asynchronous server operation on the specified object.

Figure 10:
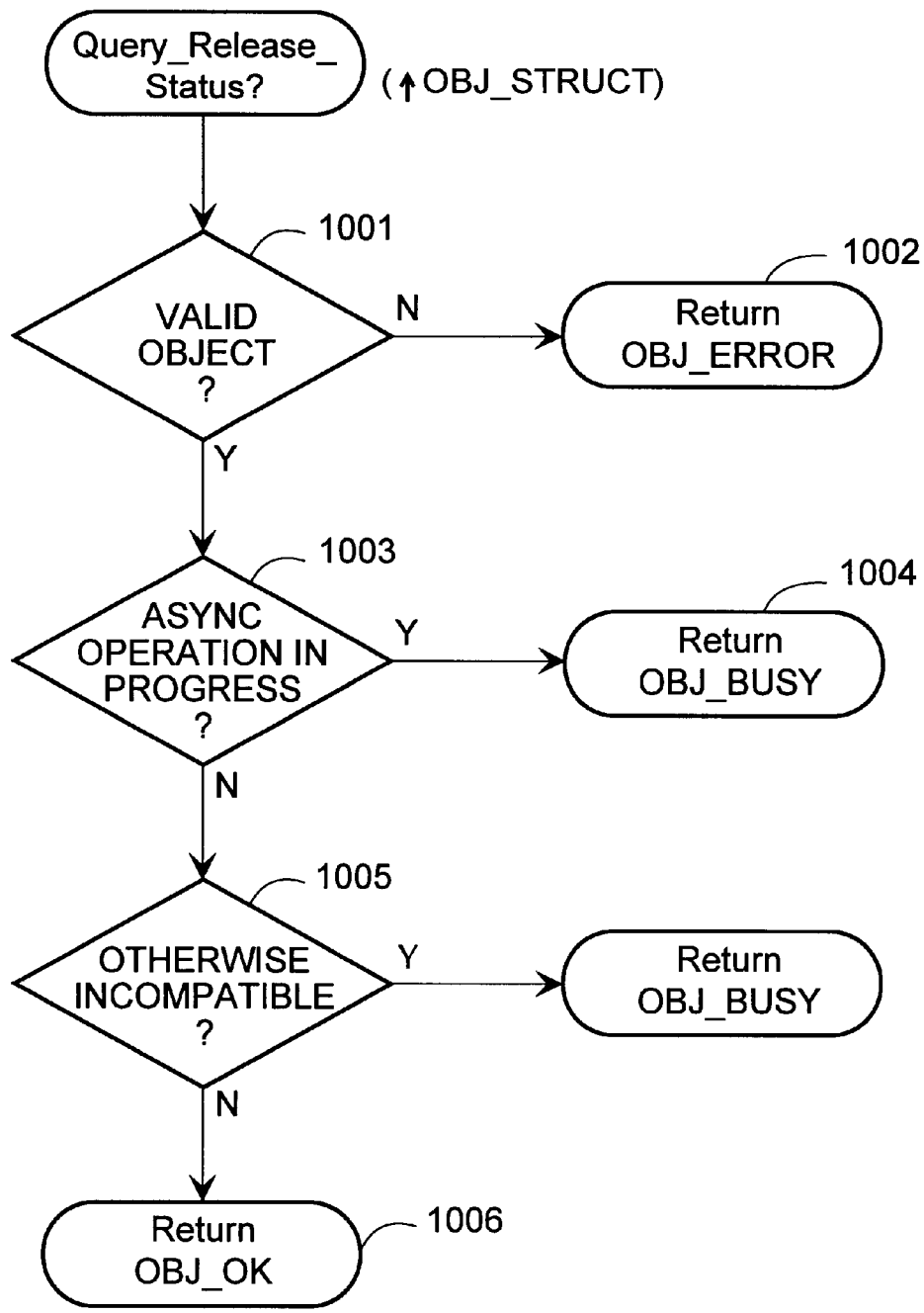
FIG. 10 is an overview flow diagram for the client library routine Query_Release_Status?

FIG. 10 shows an overview flow diagram for the client library routine Query_Release_Status? This routine takes one parameter, a pointer to an object (an OBJ_STRUCT as shown in FIG. 8) and returns OBJ_BUSY if the server for the object is unavailable or OBJ_OK if the server can process an asynchronous operation. In step 1001, the function first ensures that the parameter is a valid pointer to an object and returns OBJ_ERROR in step 1002 if it is not. In step 1003, if an asynchronous operation is in progress on the object, the function returns OBJ_BUSY in step 1004. This occurs when a RELEASE message for the object has not yet been sent to the client. The client library is responsible for keeping track of any asynchronous operations it invokes on behalf of an object. In step 1005, the client library also checks to ensure the server is not busy for other reasons, for example, the server has requested the server library to postpone all linking and embedding activities. Once a RELEASE message has been sent to the client application, Query_Release Status? returns OBJ_OK in step 1006.

Opening a Compound Document

Figure 11:
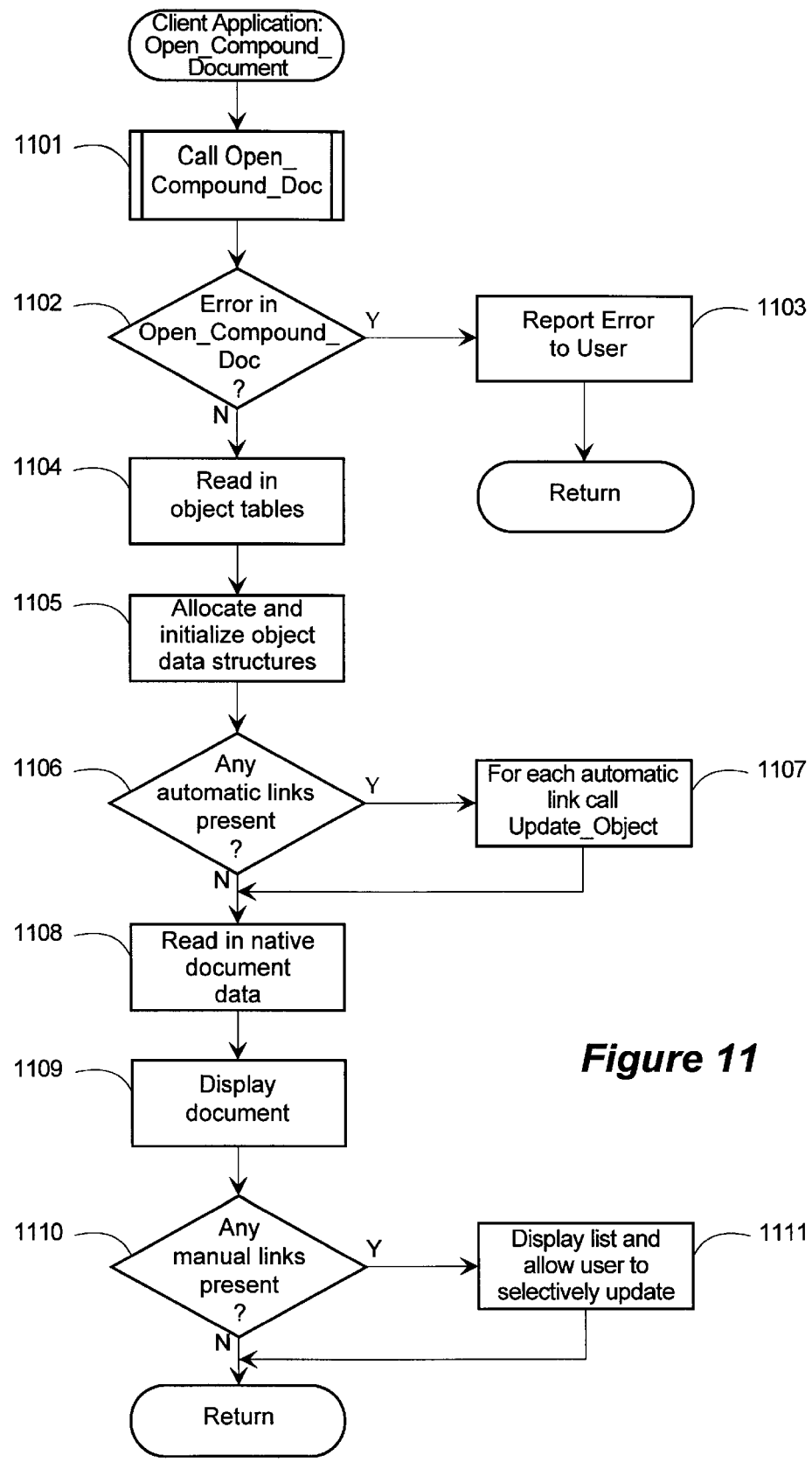
FIG. 11 is an overview flow diagram of the procedure a client application follows to open or create a compound document.

FIG. 11 shows an overview flow diagram of the typical procedure a client application follows to open or create a compound document. In step 1101, the client application calls the client library function Open_CompoundDoc to open (or create) a file for the specified compound document. In step 1102, if the open_CompoundDoc returns an error, then the client application reports this to the user in step 1103 and returns to the message-dispatch loop. In step 1104, the application reads in its linked and embedded object tables. In step 1105, the client application allocates and initializes object data structures. for each embedded or linked object. In step 1106, if there are any automatic links contained in the compound document, then the function continues at step 1107, else it continues at step 1108. In step 1107, the client application calls function Update_Object for each automatic link found. Next, in step 1108, it reads in the native data and displays the data in step 1109 using its standard application specific mechanism. In the process of displaying its data, if the client application encounters an embedded object, it calls function Display_object, which invokes the appropriate server to display the object. In step 1110, the client application checks to see if there are any manual links. If so, the client application continues at step 1111, otherwise the application returns to the message-dispatch loop. In step 1111, the application lists the manual links and allows the user to selectively update them. A manual link is one that requires the user to explicitly tell the client application to perform the update. After the desired manual links are updated, the client application returns to the message-dispatch loop.

Registering Data Formats

The present invention allows a client and server application to exchange data in particular formats. The formats can be defined dynamically and displayed to the user of a client application without intervention by a server application. In a preferred embodiment, the client application obtains the formats available for a particular object class from a server application supplied list of the formats stored in the persistent global registry. The server application (or an object handler) can update the list of formats (register the formats) at any time. The client application uses the registering data format capabilities to perform operations like changing the display representation of an arbitrary object on user demand and to incorporate an independently implemented server application as an engine for processing the client native data.

As discussed above, the persistent global registry is a database of information to support the object linking and embedding functions. The persistent global registry is preferably stored on a long-term storage device, such as a disk. Data formats are stored in the persistent global registry indexed by CLASS_ID. A server application that implements an object is responsible for storing the data formats that it supports in the persistent global registry. The server applications store the data formats that it supplies data in and the data formats that it can receive data.

Two examples will serve to illustrate these capabilities of the present invention. In the example of FIG. 1, a user is generating a report for a certain manufacturing project. Suppose the user wishes to change the representation of the scheduling data 102, which was produced using the project management program 201 (FIG. 2), from a Gantt chart to a Pert chart. (A Gantt chart displays scheduling data as a sideways barchart with a bar for each task, and a Pert chart displays such data using circles to show tasks and connects them to show dependencies and critical paths.) The client application, the word processor program 206 (FIG. 2), can provide this capability to the user through a "Change Formats" command on the client application "View" menu. When the user selects "Change Formats" for the selected object, the client application determines from the persistent global registry what formats the server application for the selected object supports, displays a list of these formats to the user for selection, and then, once the user has selected a format, requests the data from the server application in the selected format and displays the new representation.

Figure 12A:
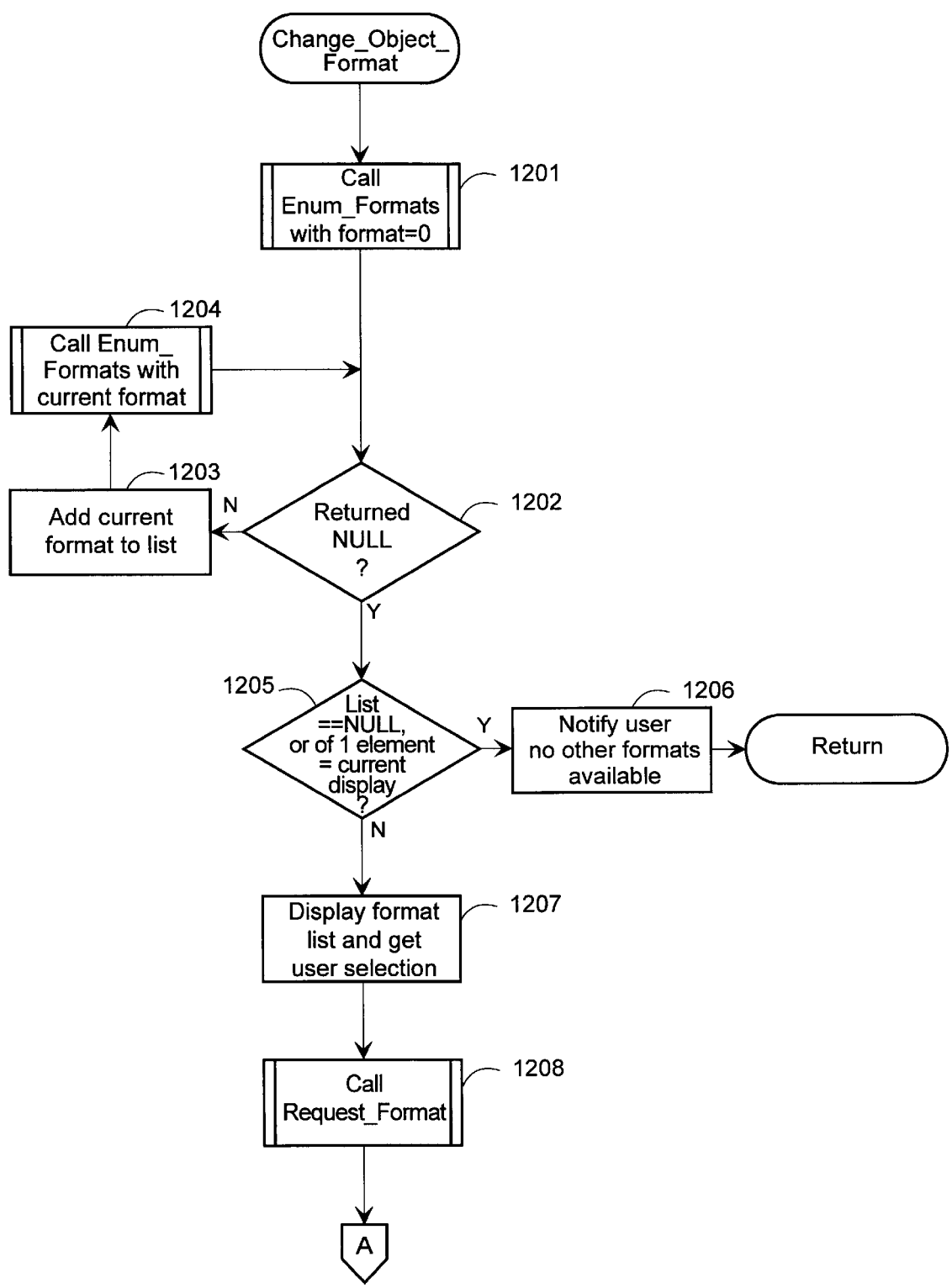
FIG. 12 is a flow diagram of the function Change_Object_Format implemented by a typical client application.
Figure 12B:
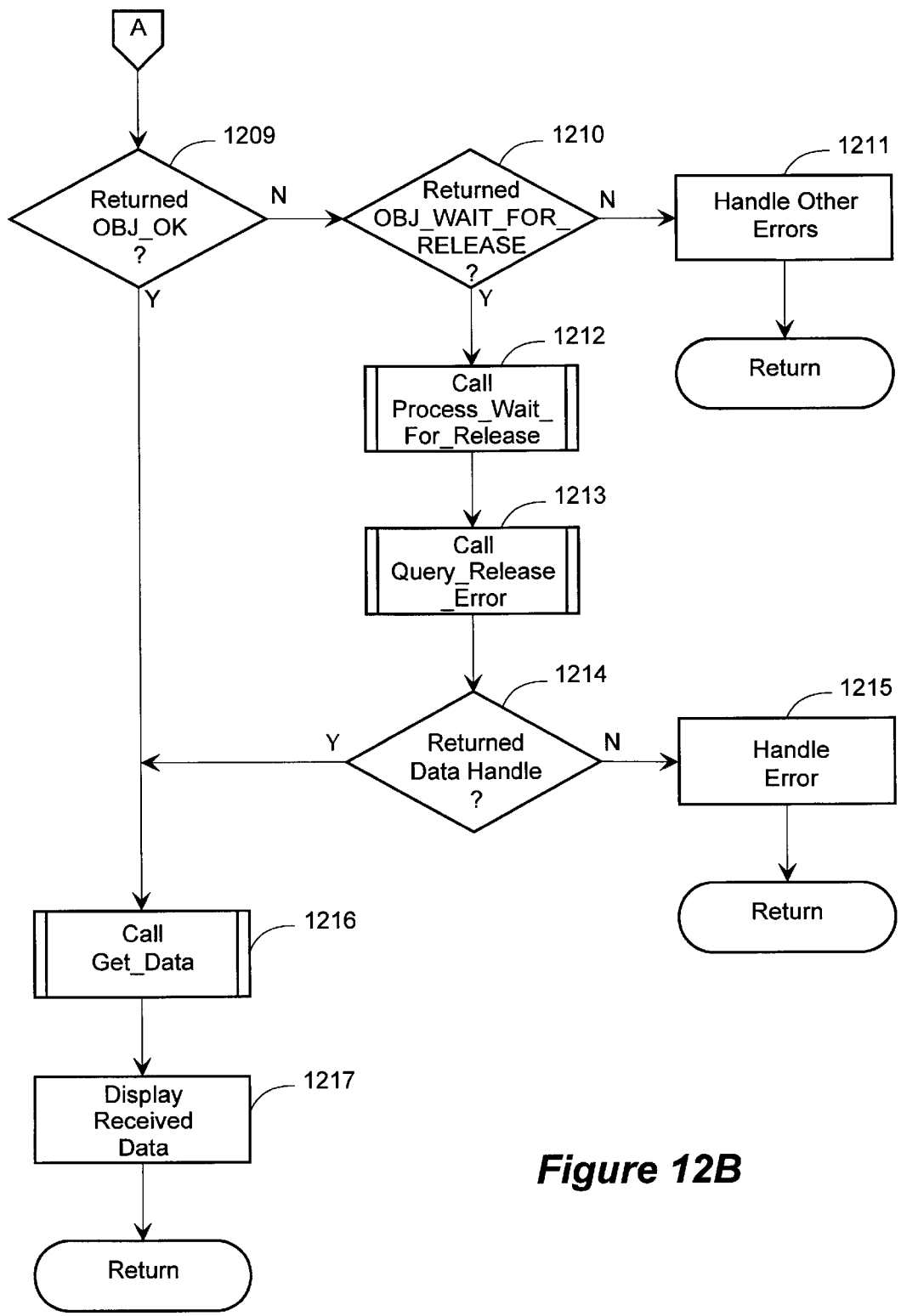

FIG. 12 shows a flow diagram of the function Change_Object_Format implemented by a typical client application. This function is called by the client application when the client determines that the user has selected "Change Formats" from its "View" menu. The function determines what formats the selected object supports, gets the data from the server application in the format the user selects, and displays the data. In steps 1201 through 1204, the function calls the client library routine Enum_Formats in a loop until the client application obtains a list of all the available formats for the selected object. The client library function Enum_Formats is described in detail below. In step 1201, the function calls Enum_Formats with 0 as an input parameter. Function Enum_Formats returns the first available format. In step 1202, if the format returned was NULL, then all formats have been obtained and the function continues at step 1205, otherwise it continues at step 1203. In step 1203, the function stores the returned format in a list. In step 1204, the function calls Enum_Formats with the format that was returned from the previous call to Enum_Formats. The function then loops to step 1202 to test the result returned from Enum_Formats. Once all of the formats have been retrieved and added to the list, the test in step 1202 will cause the function to continue at step 1205. In step 1205, the function tests to see if there is anything on the list or if there is only one format available and it is the same as what is currently being displayed. If either case is true, the function informs the user in step 1206 that no other formats are available and returns. Otherwise, the function continues in step 1207.

In step 1207, the function displays the list of formats to the user and obtains a format selection from the user. In step 1208, the function calls the client library function Request_Data to tell the server application to deliver the data in the desired format to the client library if the server application is available to do so. The function Request_Data is described below in detail. In step 1209, if function Request_Data returns OBJ_OK, then the function continues at step 1216, otherwise the function continues at step 1210. In step 1210, if function Request_Data returns OBJ_WAIT_FOR_RELEASE, then the function continues in step 1212, else the function handles the error in step 1211 and returns. In step 1212, the function calls the client application routine ProcessWait_For_Release, shown in FIG. 7, in a mode that blocks all user input. Step 1212 completes when the client library has received an answer from the server application and has notified the client application. In step 1213, the function calls the client library function Query_Release_Error to determine the result from the Request_Data call. The function Query_Release_Error allows a client application to determine whether the asynchronous operation completed successfully. In step 1214, if this result is a handle to data, then the function can continue in step 1216 to get the data. Otherwise, the function handles the error in step 1215 and returns. In step 1216, the function calls the client library function Get_Data, described in detail below, to retrieve the data in the format selected by the user. Finally, in step 1217, the function calls a routine to display the retrieved data and returns.

Figure 13:
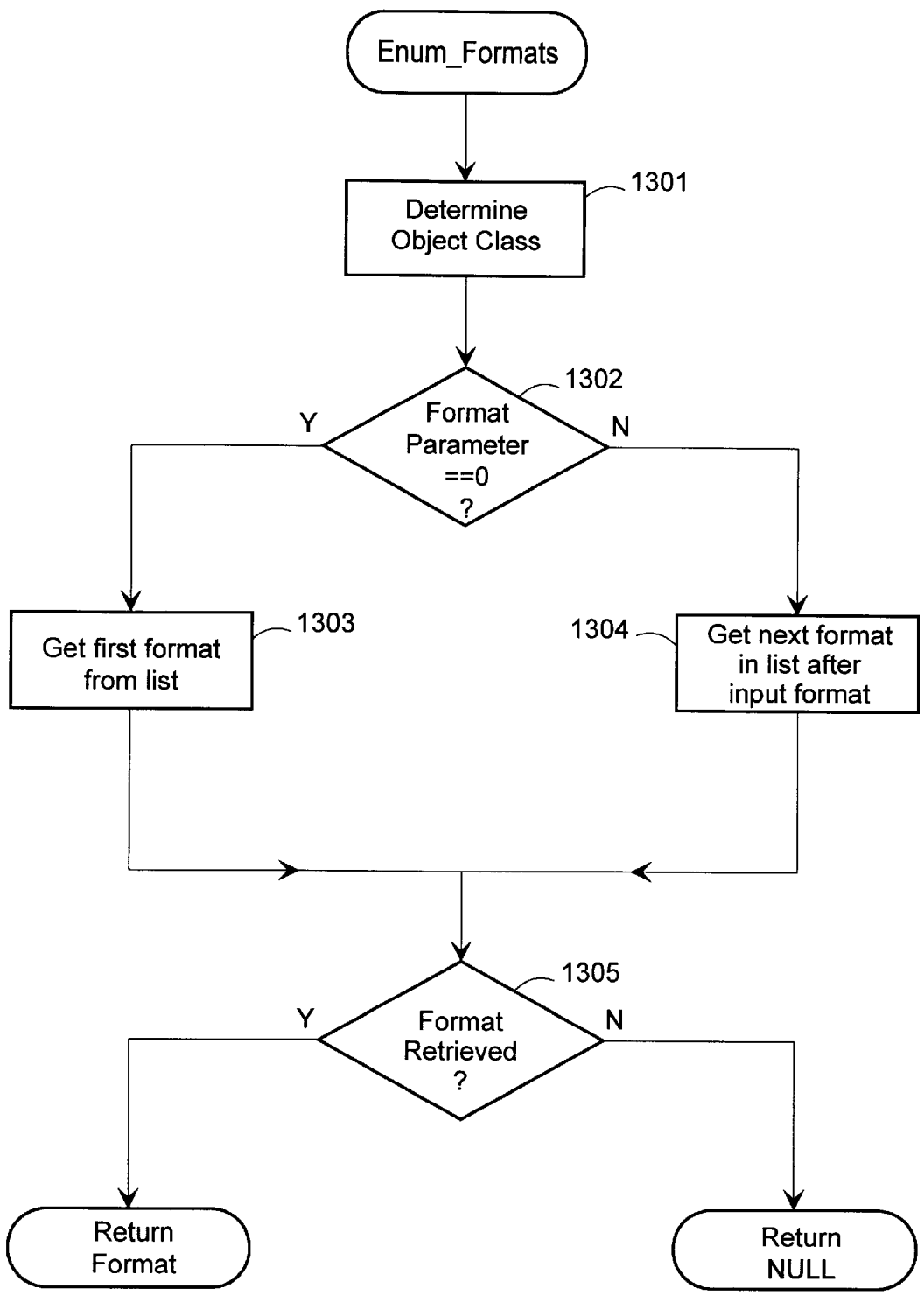
FIG. 13 is a flow diagram of the client library function Enum_Formats.

FIG. 13 is a flow diagram of the client library function Enum_Formats. In a preferred embodiment, Enum_Formats retrieves from the persistent global registry the next format from the list of formats available for the class of the selected object. This function takes an input parameter which is the format retrieved from a previous call to Enum_Formats and a pointer to the selected object data structure. If the format retrieved from the previous call indicates a 0, then this function returns the first format in the list. In step 1301, the function determines the object CLASS_ID from the selected object data structure. In step 1302, if the format input parameter is 0, then the function continues at step 1303, else it continues at step 1304. In step 1303, the function looks up the format list corresponding to the object CLASS_ID and returns the first format in the list, or NULL if the format list is empty. In step 1304, the function looks up the format list corresponding to the object CLASS_ID, finds the format that matches the format input parameter, and returns the next format in the list, or NULL if there are no more formats in the list. In step 1305, the function checks to see if a format was retrieved and if one was, then it is returned, otherwise the function returns NULL.

Figure 14A:
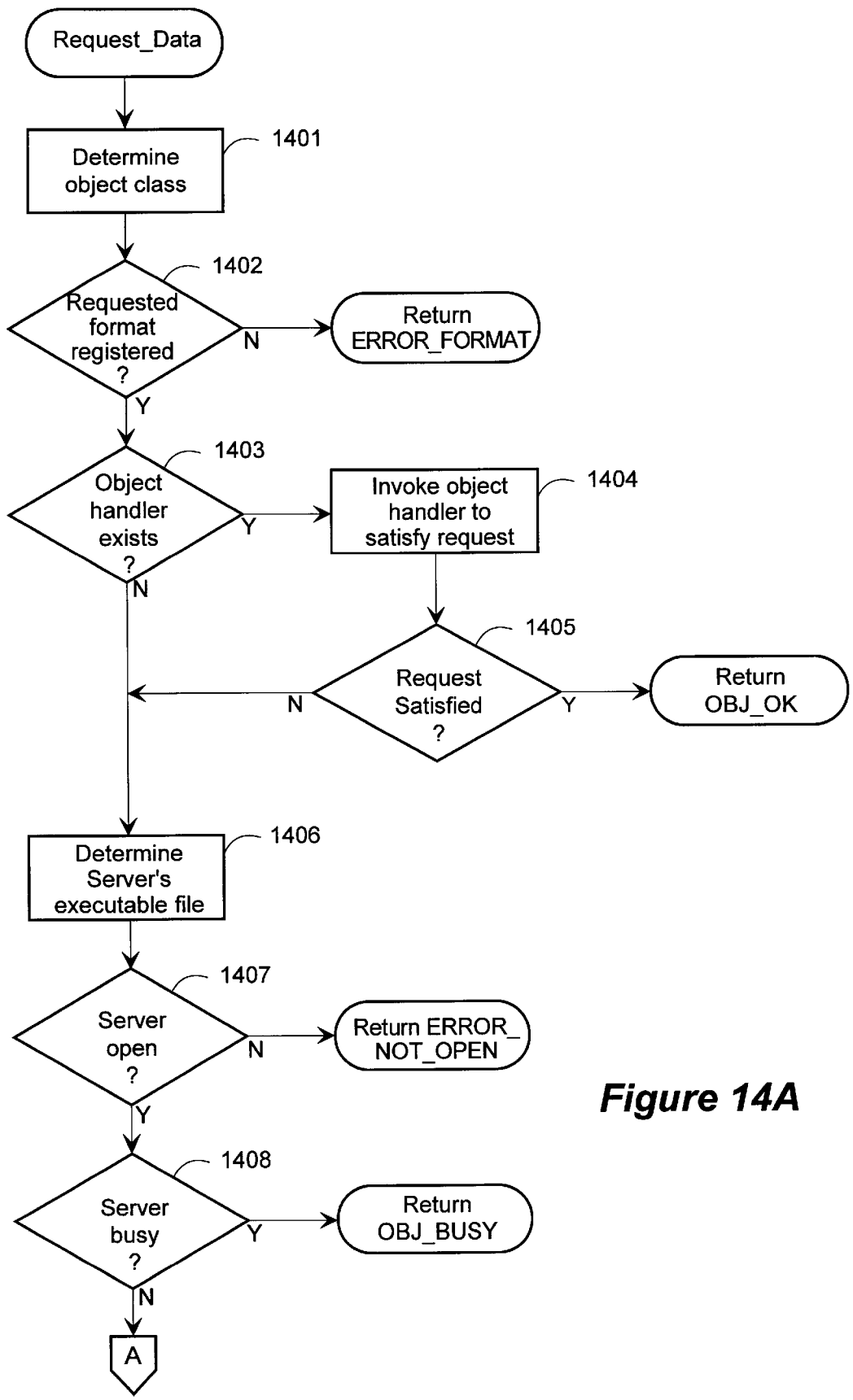
FIG. 14 is a flow diagram of the client library routine Request_Data and the corresponding server routine.
Figure 14B:
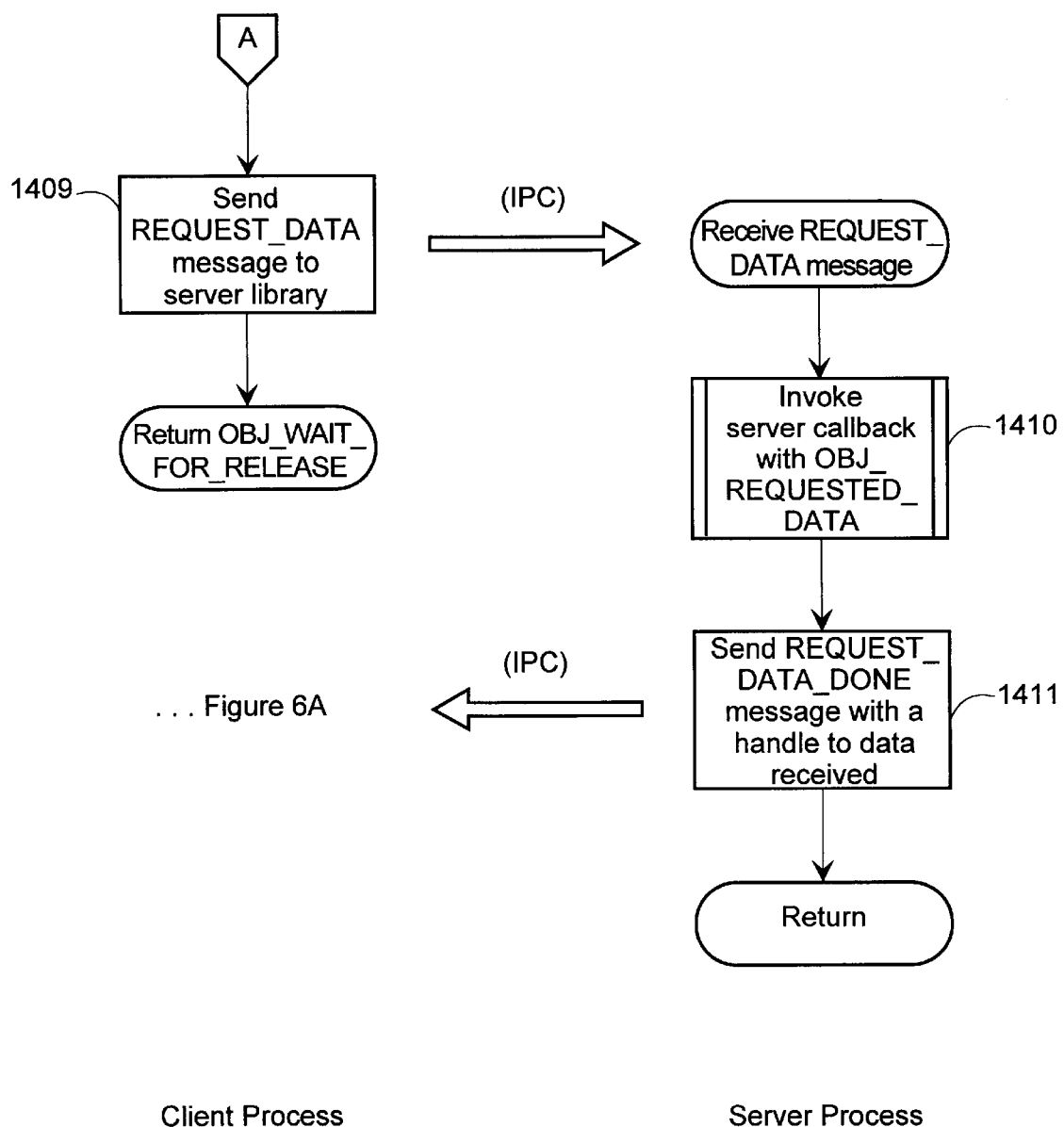

FIG. 14 is a flow diagram of the client library routine Request_Data and the corresponding server application processing required. The Request_Data function retrieves object data in a specified format from a server application. If the server application is busy, the function Request_Data returns with a WAIT_FOR_RELEASE message and the client application should not call the function Get_Data until the callback notification has been received. A client application calls Request_Data before calling Get_Data. Function Get_Data retrieves the data in the requested format from the object. Request_Data takes two input parameters: a pointer to the selected object data structure and the requested format. In step 1401, the function determines the object CLASS_ID from the selected object data structure. In step 1402, if the requested format is registered in the persistent global registry for the object class, then the function continues at step 1403, otherwise the function returns ERROR_FORMAT. In step 1403, the function checks the registry to determine whether there is an object handler defined for the object class. If there is none, the function continues at step 1406, otherwise it continues at step 1404. In step 1404, the function invokes the object handler to satisfy the data request. In step 1405, if the handler can satisfy the request (it returned OBJ_OK), then the function returns OBJ_OK. A handler is likely to be able to satisfy a Request_Data call in situations where the requested data format is a presentation format. If the handler cannot satisfy the request, the program continues at step 1406. In step 1406, the function determines which server application implements the selected object by checking the persistent global registry. In step 1407, the function determines whether the server application is connected or launched (open). If the server application is not open, then the function returns ERROR_NOT_OPEN, otherwise it continues at step 1408. In step 1408, the function checks to see if the server application is busy, and if it is, it returns OBJ_BUSY, otherwise it continues at step 1409. In step 1409, the function sends a REQUEST_DATA message to the server asynchronously, passing it the requested format, and a handle to the object. Finally, the function returns OBJ_WAIT_FOR_RELEASE to the client application so that the client knows it must wait for an asynchronous response.

On the server side, when the server library receives the REQUEST_DATA message, it invokes the callback routine of the server application in step 1410 passing it a OBJ_REQUESTED_DATA notification and the handle to the object. The server application processes the request, and the callback routine returns a handle to the data in the requested format to the server library. If an error occurs, the callback routine returns an error value instead. In step 1411, the server library sends the message REQUEST_DATA_DONE to the client library passing the handle to the data or the error value returned by the server application.

Then, when the client library asynchronously receives the REQUEST_DATA_DONE message in its message handling routine (see FIG. 6A), in step 604, the library invokes the callback routine of the client application passing it a OBJ_RELEASED notification. At this point, step 1212 (see FIG. 12) of the client application function Change_Object_Format will complete and user input to the client will no longer be blocked. As described in FIG. 12, if the value returned by the server is a handle to data, then the client application will be free to retrieve the data using function Get_Data. One skilled in the art would appreciate that different mechanisms can be used to actually pass the data. Typical examples are that the data can be passed in shared memory or that each process is provided support from the underlying operating system to copy the data into its own address space by passing the operating system a handle to the data.

Figure 15:
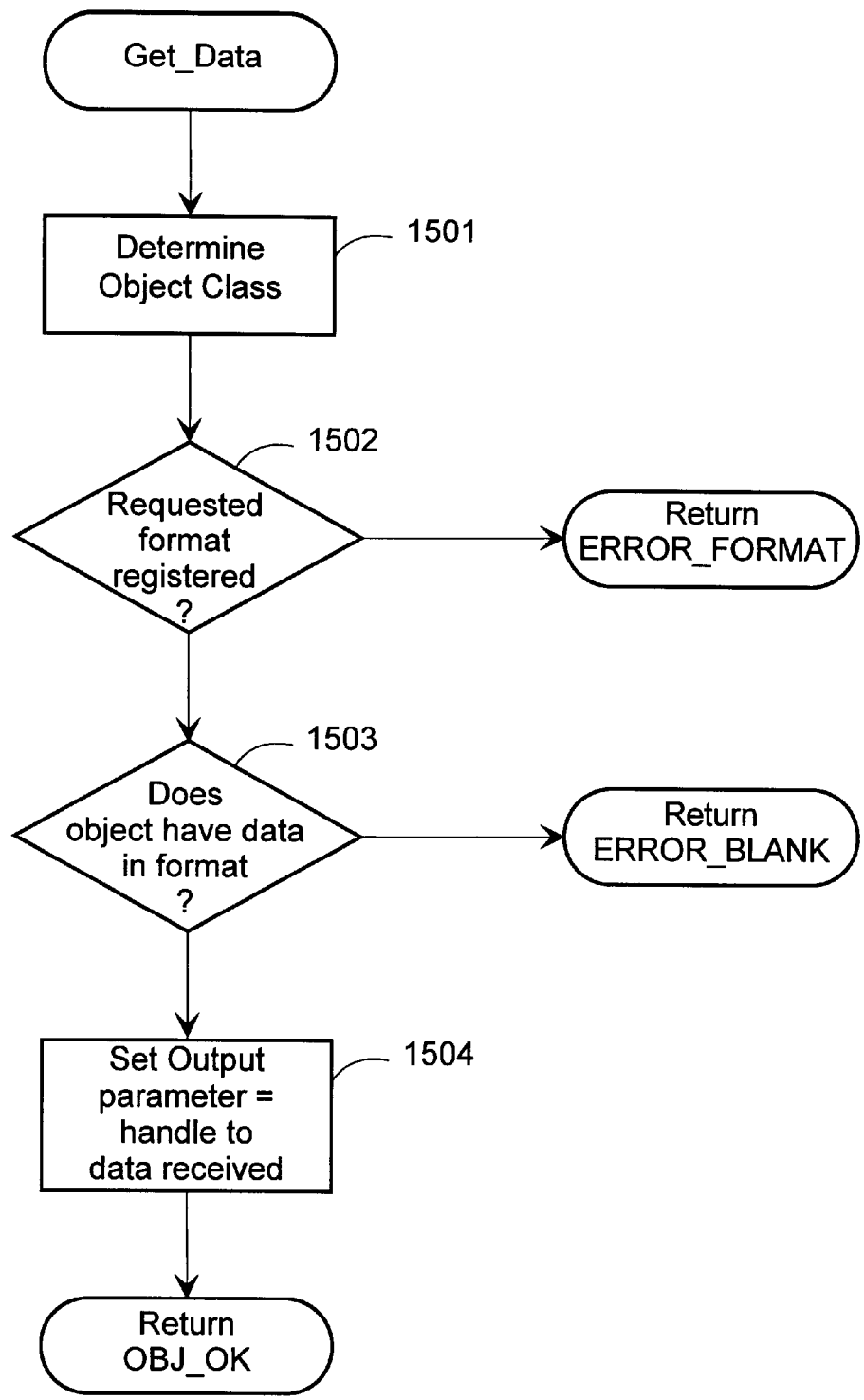
FIG. 15 is a flow diagram of the client library function Get_Data.

FIG. 15 is a flow diagram of the client library function Get_Data. The function Get_Data checks the object to determine if it has data in the requested format and returns the data to the client application. Three parameters are passed to the function Get_Data: a pointer to the object data structure, the requested format, and an output parameter which is a handle to the data. In step 1501, the function determines the object CLASS_ID from the object data structure. In step 1502, if the input format is registered in the persistent global registry for the class of the object, then the function continues at step 1503, otherwise the function returns ERROR_FORMAT. In step 1503, the function checks to see if client library has received data from the server application in the requested format. The object data structure maintains a list of available formats for the data. This list is updated when a Request_Data call results in a new format being received. If the test in step 1503 fails, the function returns ERROR_BLANK to the client application. In step 1504, the function sets the output parameter to the handle of the data in the requested format and returns OBJ_OK.

Figure 16:
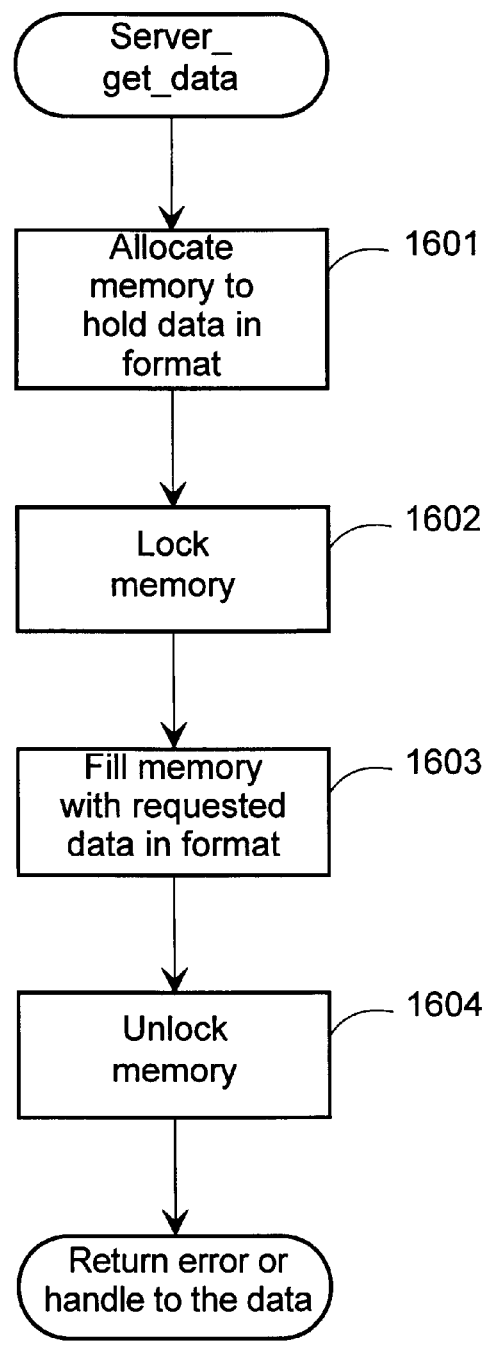
FIG. 16 is a flow diagram of the server application routine Server_Get_Data.

FIG. 16 is a flow diagram of the server application routine Server_Get_Data. This function is invoked from the server application callback routine when it receives the OBJ_REQUESTED_DATA notification from the server library (see step 1410 in FIG. 14). The function Server_Get_Data allocates memory and fills it with the object data in the requested format and returns a handle to the data or an error value. The function requires two parameters: a handle to the object and the requested format. In step 1601, the function allocates enough memory to hold the data in the requested format. In step 1602, it locks the memory in order to provide an atomic operation. In step 1603, the function fills the memory with data from the object in the requested format. In step 1604, it unlocks the memory. Finally, it returns either the handle to the data or an error value.

A second example will help illustrate how a client application incorporates registering data format capabilities to use a server application as an engine for filtering its data. Suppose that the user generating the manufacturing project report in FIG. 1 is actually working on a project which is a subpart of a much larger manufacturing project that involves multiple project teams. Suppose further that the user's manager maintains a spreadsheet of the scheduling data of the entire manufacturing project, and each project team is responsible for entering the scheduling data for its subpart into the manager's spreadsheet. Each project team is also responsible for producing a weekly status report to the manager.

Figure 17:
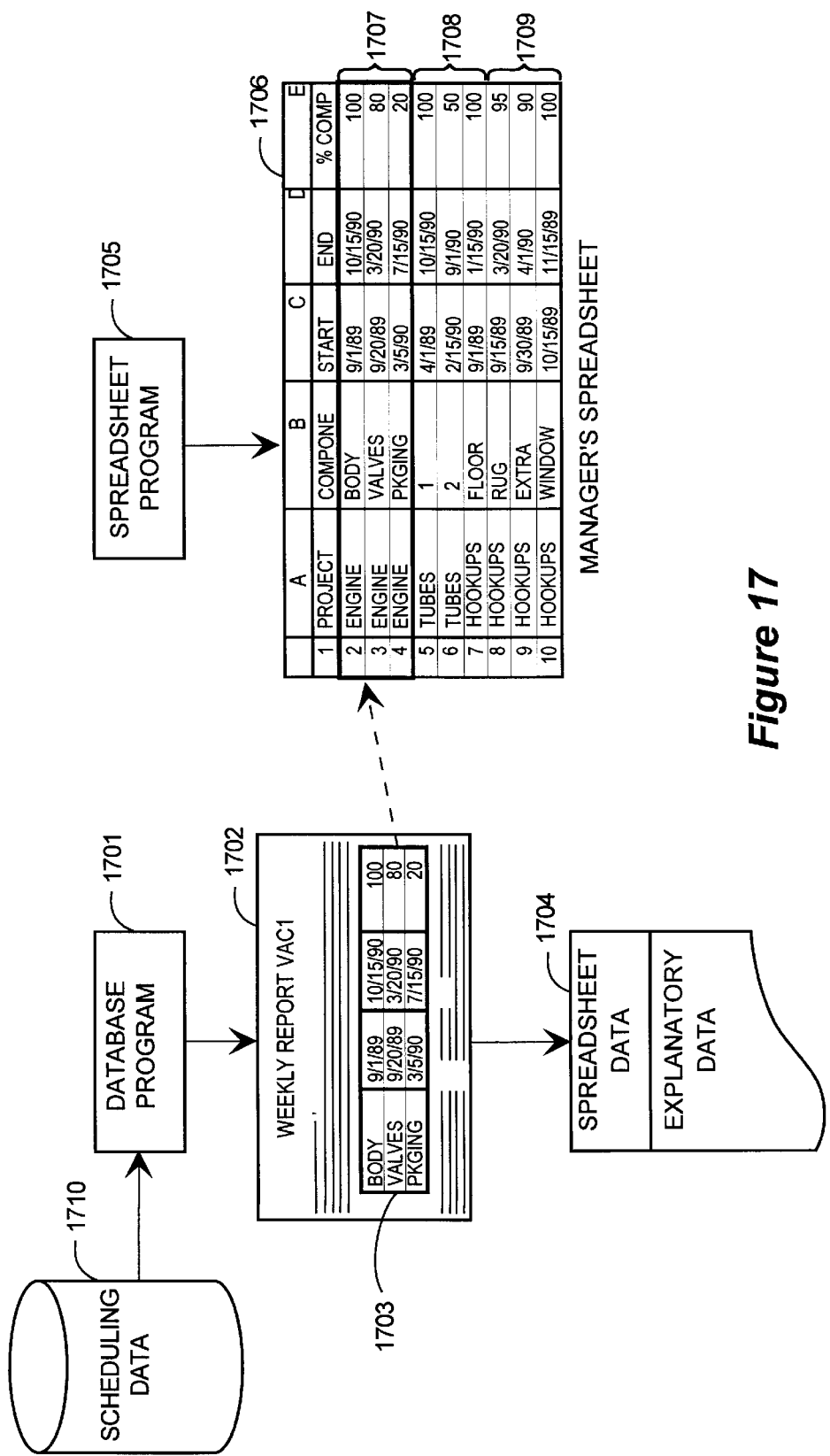
FIG. 17 is a block diagram of the object linking and embedding used to generate the spreadsheet scheduling data and the weekly reports.

FIG. 17 shows how object linking and embedding is used to generate the spreadsheet scheduling data and the weekly reports. Each project team uses the database program 1701 to enter scheduling data, which is stored in a database 1710, to update the manager's spreadsheet 1706, and to produce weekly reports 1703 using a report form 1702.

In this example, the database program allows the user to generate reports from the data in the layout specified by a report form 1702 that the user has previously created. The report form 1702 contains display fields that are database queries which are filled in by the database program when the report is actually generated. The report form 1702 is a compound document and can contain arbitrary embedded or linked objects created by other applications. On the report form 1702, the user has placed a linked object 1703, which is the scheduling data for the user's project team. The data for the linked object is stored in the manager's spreadsheet 1706.

In this example, database program 1701 provides the ability to insert an arbitrary object (here a linked spreadsheet object) and to set or update its contents with native data through two commands, "Insert Object," and "Update Object Contents," found on the "Edit" menu of the database program. When the user selects the "Insert Object" command, the database program 1701 presents the user with a list of the classes of objects defined in the persistent global registry. Once the user has selected the type of object to create and specifies whether the object should be linked or embedded, the database program 1701 creates a default object of that CLASS_ID using the standard client library routine, Create Object. In our example, a linked default spreadsheet object is created.

To initially set the data, or at any later time when the user wishes to update the data, the user selects the command "Update Object Contents". When "Update Object Contents" is invoked on a selected object, the database program presents a form for the user to fill in with database queries specifying the data to be placed in the selected object. Once the user has completed this form, the database program 1701 causes the data of the object to be changed by invoking the client library routine Send_Data. The range in the manager's spreadsheet 1706 is updated to reflect the scheduling data that was specified in the "Update Object Contents" form.

The spreadsheet program 1705 is used by the user's manager to view the scheduling data for the entire manufacturing project in the manager's spreadsheet 1706. This spreadsheet contains the ranges of data that were actually created by the component project teams as described above. Whenever each project team chooses to update the manager's spreadsheet using Update Object Contents, the manager will have an updated synopsis of project progress.

Figure 18:
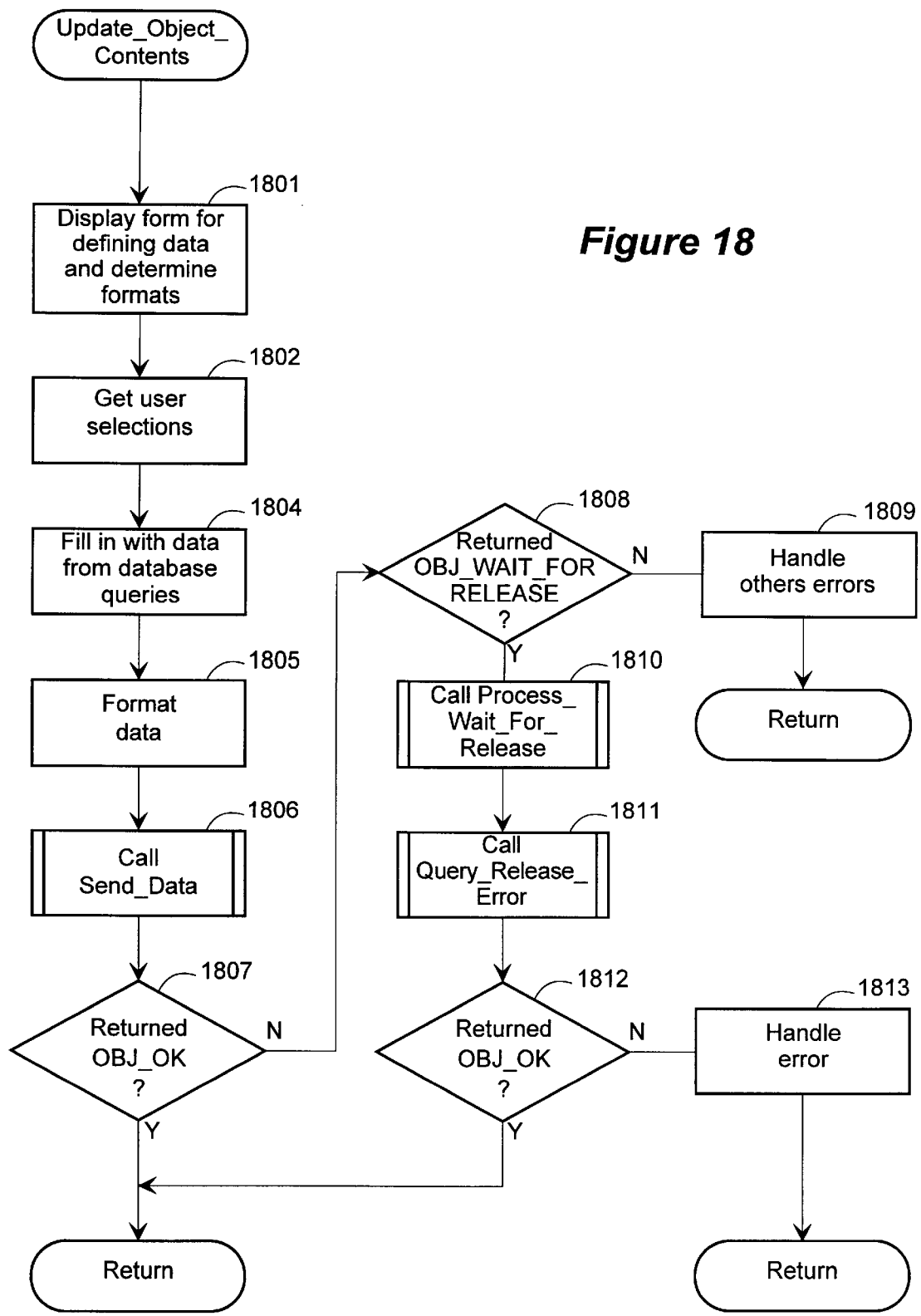
FIG. 18 is a flow diagram of the function Update_Object_Contents.

FIG. 18 shows the flow diagram for function Update_Object_Contents. This function allows the user to specify which data is to be sent to the object. In a preferred embodiment, this function is passed an object that is to have its data set. The function determines the object class and retrieves from the persistent registry which data formats the object supports for setting data. The function determines if it can support any of these data formats (e.g., standard spreadsheet format). If it can, then the function allows the user to specify which data from the database is to be sent to the object. In step 1801, the function displays a standard input selection form for a format that the object server supports (e.g., a spreadsheet). In step 1802, the function inputs the user input selections. In step 1804, the function retrieves the data from the database as indicated by the user selections. In step 1805, the function puts the data in a format that is compatible with the object server. In step 1806, the function invokes the function Send_Data to send the formatted data to the object. In step 1807, if function Send_Data returns an OBJ_OK message, the function returns, else the function continues as step 1808. In step 1808 through 1813, the function waits for the asynchronous invocation of function Send_Data to complete and the function returns. This is the same process as is described in steps 1110 through 1115 of FIG. 11.

Figure 19A:
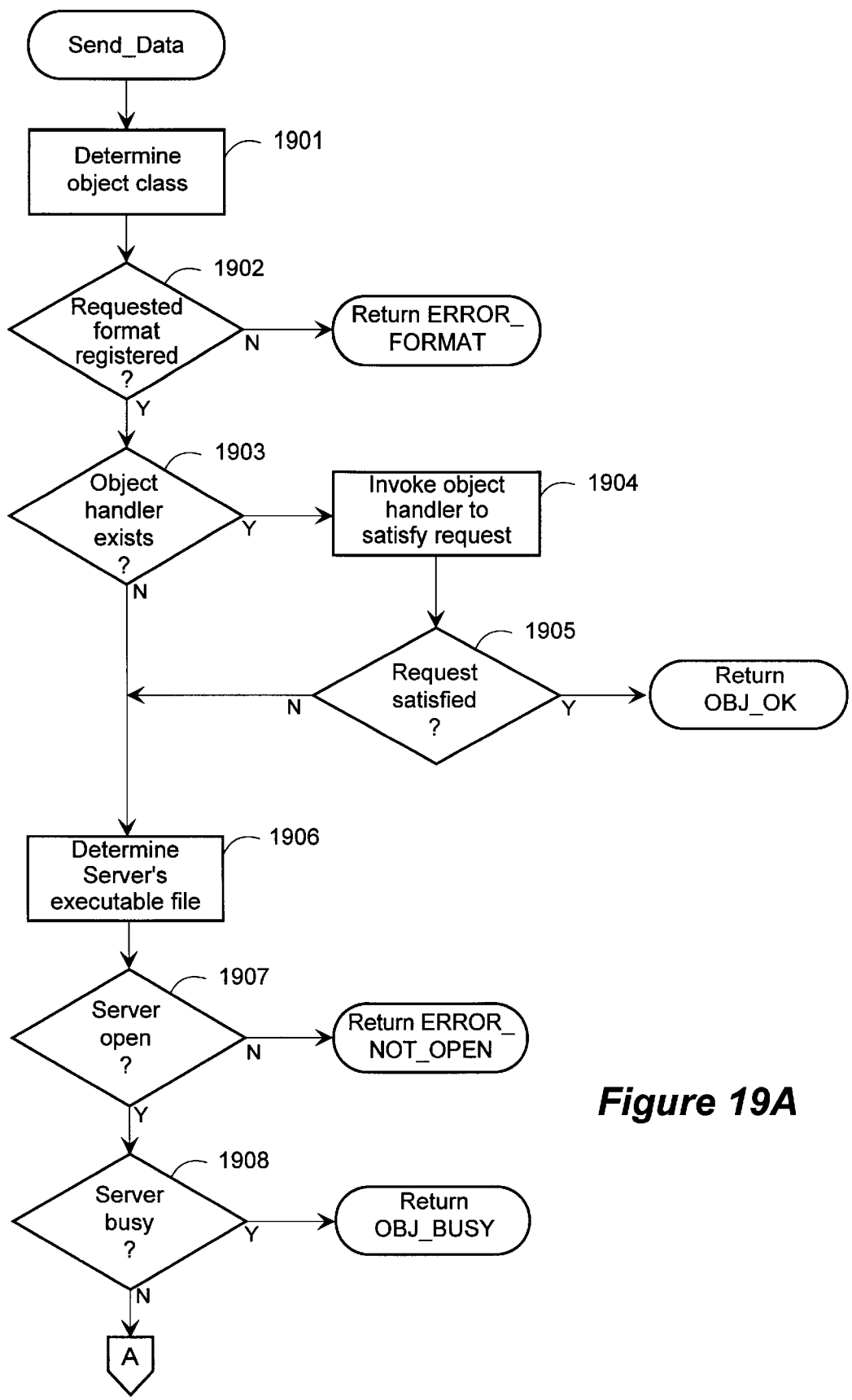
FIG. 19 is a flow diagram for the client library routine Send_Data and corresponding server routine.
Figure 19B:
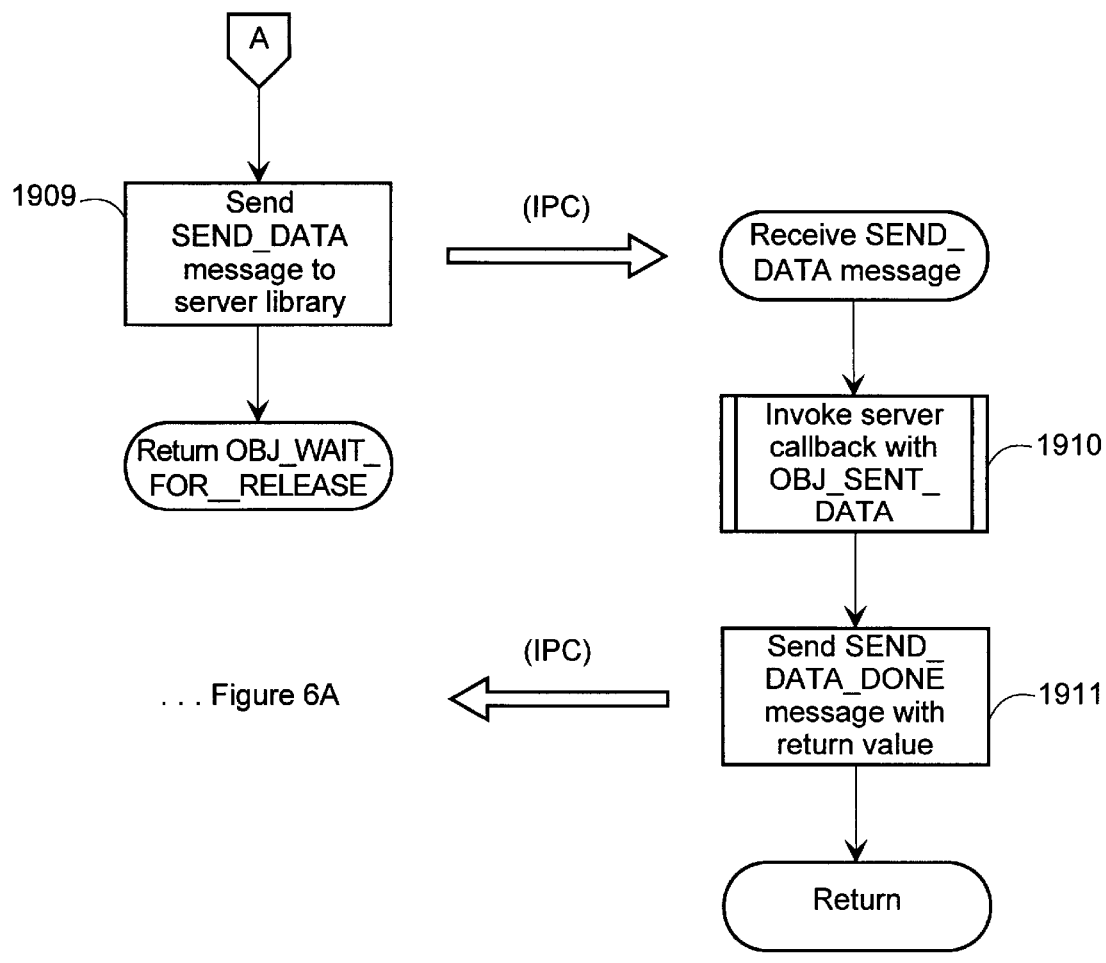

FIG. 19 shows the flow diagram for the client library routine Send_Data and the corresponding server processing required. The Send_Data function checks to ensure the server for the selected object can set the object data in the requested format and sends the data to the server if it can. The function Send_Data has three input parameters: a pointer to the selected object data structure, a handle to the data, and the requested format. In step 1901, the function determines the object CLASS_ID from the selected data structure. In step 1902, if the input format is registered in the persistent global registry for the object class, then the function continues at step 1903, otherwise the function returns ERROR_FORMAT. In step 1903, the function checks in the registry to see if there is an object handler defined for the object. If there is none, the function continues at step 1906, otherwise it continues at step 1904. In step 1904, the function invokes the object handler to satisfy the send request. In step 1905, if the handler can satisfy the request (it returned OBJ_$_b$OK) then the function returns OBJ_OK. If the handler cannot satisfy the request, the program continues at step 1906. In step 1906, the function determines the location of the server for the object class. In step 1907, the function determines whether the server is connected (open). If the server is not open, the function returns ERROR_NOT_OPEN, otherwise, it continues at step 1908. In step 1908, the function checks to see if the server is busy and, if it is, it returns OBJ_BUSY, otherwise it continues at step 1909. In step 1909, the function sends a SEND_DATA message to the server asynchronously, passing it a handle to the data, the requested format, and a pointer to the object. Finally, the function returns OBJ_WAIT_FOR_RELEASE to the client application so that the client knows it must wait for an asynchronous response.

On the server side, when the server library receives the SEND_DATA message, it invokes the callback routine of the server application in step 1910 passing it a OBJ_SENT_DATA notification, a handle to the data, the requested format, and the handle to the object. If the server application successfully processes the request, the callback routine will return an OBJ_OK value to the server library, otherwise the callback will return an error value. In step 1911, the server library sends the message SEND_DATA_DONE to the client library with the value returned by the server application.

Then, when the client library asynchronously receives the SEND_DATA_DONE message in its message handling routine (see FIG. 6A), in step 604, the library invokes the callback routine of the client application passing it an OBJ_RELEASE notification. At this point, step 1810 (see FIG. 18) of the client application function Update_Object_Contents will complete.

Although the present invention has been described in terms of a preferred embodiment, it is not intended that the invention be limited to his embodiment. Modifications within the spirit of the invention will be apparent to those skilled in the art. The scope of the present invention is defined by the claims which follow.

I claim:

1. A method in a computer system of transferring data between a client and a server, the computer system having a persistent global registry for storing data format information, the method comprising the steps of:
   under control of the computer system,
      storing in the persistent global registry a plurality of data formats that the server supports;
   after storing the data formats, re-initializing the computer system, whereby the server is not launched; and
   under exclusive control of the client,
      determining from the persistent global registry without launching the server whether there is a stored data format that the server supports that is also a data format supported by the client;
      when it is determined there is a stored data format that is supported by both the server and the client, retrieving the determined stored data format;

launching the server; and exchanging data between the client and the launched server in the retrieved format; and when it is determined there is not a stored data format that is supported by both the server and the client, suppressing the launching of the server, whereby the client avoids the overhead of launching the server.

2. The method of claim 1 wherein the determined stored data format that the server supports is a data format supported by the server for receiving data.

3. The method of claim 1 wherein the determined stored data format that the server supports is a data format supported by the server for sending data.

4. The method of claim 1 wherein the determining from the persistent global registry whether there is a stored data format that the server supports that is also a data format supported by the client, further comprises:

determining from the registry a plurality of stored data formats supported by both the server and the client;

displaying on a display device the determined plurality of stored data formats; and designating a displayed data format as the determined stored data format.

5. The method of claim 4 wherein designating is performed by a user selecting an indication of a data format.

6. The method of claim 1 wherein the storing of the plurality of data formats in the persistent global registry is performed when an application that corresponds to the server is installed onto the computer system.

7. The method of claim 1 wherein the storing of the plurality of data formats in the persistent global registry is performed when the server is launched.

8. The method of claim 1 wherein the exchanging data between the client and the launched server in the retrieved format comprises:

under control of the client, sending data from the client to the server; and under control of the server, receiving the data sent from the client.

9. The method of claim 1 wherein the exchanging data between the client and the launched server in the retrieved format comprises:

under control of the server, sending data from the server to the client; and under control of the client, receiving the data sent from the server.

10. The method of claim 1 further comprising storing in the persistent registry a plurality of data formats that the client supports and using the stored data formats that the client supports and the data formats that the server supports to determine whether there is a stored data format that is supported by both the client and the server.

11. A method in a computer system of transferring data between a client and a server, the computer system having a persistent global registry for storing data format information from a plurality of servers, the method comprising the steps of:

under control of the computer system, for each of a plurality of servers, storing in the persistent global registry a plurality of data formats that the server supports;

after storing the data formats, re-initializing the computer system; and under exclusive control of the client, after re-initializing the computer system, determining from the persistent global registry, without launching a server, whether there is a stored data format that is supported by the server that is also a data format supported by the client; and when it is determined there is a stored data format that is supported by both the server and the client, launching the server; and exchanging data between the client and the launched server in the determined format.

12. The method of claim 11 further comprising:

under exclusive control of the client, when it is determined that there is not a stored data format that is supported by both one of the servers and the client, suppressing the launching of each of the plurality of servers, whereby the client avoids the overhead of launching each of the plurality of servers to determine a common data format.

13. The method of claim 11 further comprising storing in the persistent registry a plurality of data formats that the client supports.

14. The method of claim 11 wherein the storing of the plurality of data formats in the persistent global registry for a server is performed when an application that corresponds to the server is installed onto the computer system.

15. The method of claim 11 wherein the storing of the plurality of data formats in the persistent global registry for a server is performed when the server is launched.

16. A computer system for transferring data comprising:

a persistent global registry that maintains data stored within the registry when the computer system is re-initialized; that, upon receipt of a plurality of data formats, stores the data formats; and that upon receipt of a request to determine whether a certain data format exists, returns an indication of the certain data format if the registry has stored the certain data format;

a server that sends the plurality of data formats to the persistent global registry for storage and terminates so that the server is not executing; and a client that is launched after the server has terminated; that, without launching the server, requests the registry to determine whether the certain data format exists, the certain data format being a data format supported by both the server and the client; and that, upon receipt of the indication of the certain data format, launches the server to exchange data between the client and the server.

17. The system of claims wherein 16 the client, after the launching of the server, sends data in the certain data format to the server.

18. The system of claim 16 wherein the server, after the launching of the client, receives data in the certain data format from the client.

19. The system of claim 16 wherein the server sends the plurality of data formats to the persistent global registry for storage when an application that corresponds to the server is installed onto the computer system.

20. The system of claim wherein 16 the server sends the plurality of data formats to the persistent global registry for storage when the server is launched.

* * * * *

UNITED STATES PATENT AND TRADEMARK OFFICE
CERTIFICATE OF CORRECTION

PATENT NO.    : 5,905,884
DATED         : May 18, 1999
INVENTOR(S)   : Williams

Page 1 of 1

It is certified that error appears in the above-identified patent and that said Letters Patent is hereby corrected as shown below:

Column 6,
Line 38, "that the each" should read -- that each --.
Line 64, "send" should read -- sends --.

Column 7,
Line 50, "(=object)" should read -- (↑object) --.

Column 12,
Line 63, "Display_object" should read -- Display_Object --.

Column 18,
Line 11, "OBJ_$_b$OK" should read -- OBJ_OK --.
Line 46, "his" should read -- this --.

Column 20,
Line 61, "wherein 16" should read -- 16 wherein --.

Signed and Sealed this

Sixteenth Day of October, 2001

Attest:

NICHOLAS P. GODICI
Acting Director of the United States Patent and Trademark Office Attesting Officer